(12) United States Patent
Abotabl et al.

(10) Patent No.: US 12,396,026 B2
(45) Date of Patent: Aug. 19, 2025

(54) DORMANCY INDICATIONS FOR MULTIPLE NETWORK ENTITIES

(71) Applicant: QUALCOMM Incorporated, San Diego, CA (US)

(72) Inventors: Ahmed Attia Abotabl, San Diego, CA (US); Hung Dinh Ly, San Diego, CA (US); Muhammad Sayed Khairy Abdelghaffar, San Jose, CA (US)

( * ) Notice: Subject to any disclaimer, the term of this patent is extended or adjusted under 35 U.S.C. 154(b) by 338 days.

(21) Appl. No.: 17/897,483

(22) Filed: Aug. 29, 2022

(65) Prior Publication Data

US 2024/0073941 A1    Feb. 29, 2024

(51) Int. Cl.
*H04W 74/00* (2009.01)
*H04L 5/00* (2006.01)

(52) U.S. Cl.
CPC ......... *H04W 74/006* (2013.01); *H04L 5/0053* (2013.01)

(58) Field of Classification Search
CPC .......... H04W 74/006; H04W 52/0206; H04W 52/0229; H04W 52/00–0235; H04L 5/0053
See application file for complete search history.

(56) References Cited

U.S. PATENT DOCUMENTS

| | | | | |
|---|---|---|---|---|
| 2021/0400763 A1* | 12/2021 | Zhou | ................. | H04W 52/0235 |
| 2022/0330156 A1* | 10/2022 | Zhou | ................. | H04W 52/0206 |
| 2023/0328652 A1* | 10/2023 | Zhou | ................. | H04W 52/0235 |
| | | | | 370/318 |
| 2024/0072973 A1* | 2/2024 | Niu | ....................... | H04L 5/0053 |

FOREIGN PATENT DOCUMENTS

| | | |
|---|---|---|
| EP | 3907919 A2 | 11/2021 |
| WO | 2021133705 A1 | 7/2021 |

OTHER PUBLICATIONS

International Search Report and Written Opinion—PCT/US2023/072782—ISA/EPO—Jan. 2, 2024.

* cited by examiner

*Primary Examiner* — Syed Ali
*Assistant Examiner* — Najeeb Ansari

(57) ABSTRACT

Various aspects of the present disclosure generally relate to wireless communication. In some aspects, a user equipment (UE) may receive a first dormancy indication and a second dormancy indication. The UE may communicate in a wireless network based at least in part on associating the first dormancy indication with a first dormancy state of a first network entity in the wireless network and associating the second dormancy indication with a second dormancy state of a second network entity in the wireless network. Numerous other aspects are described.

27 Claims, 9 Drawing Sheets

DORMANCY INDICATIONS FOR MULTIPLE NETWORK ENTITIES

FIELD OF THE DISCLOSURE

Aspects of the present disclosure generally relate to wireless communication and to techniques and apparatuses for dormancy indications for multiple network entities.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a first dormancy indication and a second dormancy indication. The method may include communicating in a wireless network based at least in part on associating the first dormancy indication with a first dormancy state of a first network entity in the wireless network and associating the second dormancy indication with a second dormancy state of a second network entity in the wireless network.

Some aspects described herein relate to a method of wireless communication performed by a network entity. The method may include transmitting a first dormancy indication that indicates a first dormancy state of a first network entity in a wireless network and a second dormancy indication that indicates a second dormancy state of a second network entity in the wireless network, the first network entity and the second network entity associated with a UE. The method may include communicating in the wireless network based at least in part on the first dormancy state of the first network entity or the second dormancy state of the second network entity.

Some aspects described herein relate to a UE for wireless communication. The UE may include a memory and one or more processors coupled to the memory. The one or more processors may be configured to receive a first dormancy indication and a second dormancy indication. The one or more processors may be configured to communicate in a wireless network based at least in part on associating the first dormancy indication with a first dormancy state of a first network entity in the wireless network and associating the second dormancy indication with a second dormancy state of a second network entity in the wireless network.

Some aspects described herein relate to a network entity for wireless communication. The network entity may include a memory and one or more processors coupled to the memory. The one or more processors may be configured to transmit a first dormancy indication that indicates a first dormancy state of a first network entity in a wireless network and a second dormancy indication that indicates a second dormancy state of a second network entity in the wireless network, the first network entity and the second network entity associated with a UE. The one or more processors may be configured to communicate in the wireless network based at least in part on the first dormancy state of the first network entity or the second dormancy state of the second network entity.

Some aspects described herein relate to a non-transitory computer-readable medium that stores a set of instructions for wireless communication by a UE. The set of instructions, when executed by one or more processors of the UE, may cause the UE to receive a first dormancy indication and a second dormancy indication. The set of instructions, when executed by one or more processors of the UE, may cause the UE to communicate in a wireless network based at least in part on associating the first dormancy indication with a first dormancy state of a first network entity in the wireless network and associating the second dormancy indication with a second dormancy state of a second network entity in the wireless network.

Some aspects described herein relate to a non-transitory computer-readable medium that stores a set of instructions for wireless communication by a network entity. The set of instructions, when executed by one or more processors of the network entity, may cause the network entity to transmit a first dormancy indication that indicates a first dormancy state of a first network entity in a wireless network and a second dormancy indication that indicates a second dormancy state of a second network entity in the wireless network, the first network entity and the second network entity associated with a UE. The set of instructions, when executed by one or more processors of the network entity, may cause the network entity to communicate in the wireless network based at least in part on the first dormancy state of the first network entity or the second dormancy state of the second network entity.

Some aspects described herein relate to an apparatus for wireless communication. The apparatus may include means for receiving a first dormancy indication and a second dormancy indication. The apparatus may include means for communicating in a wireless network based at least in part on associating the first dormancy indication with a first dormancy state of a first network entity in the wireless network and associating the second dormancy indication with a second dormancy state of a second network entity in the wireless network.

Some aspects described herein relate to an apparatus for wireless communication. The apparatus may include means for transmitting a first dormancy indication that indicates a first dormancy state of a first network entity in a wireless network and a second dormancy indication that indicates a second dormancy state of a second network entity in the wireless network, the first network entity and the second network entity associated with a UE. The apparatus may include means for communicating in the wireless network based at least in part on the first dormancy state of the first network entity or the second dormancy state of the second network entity.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
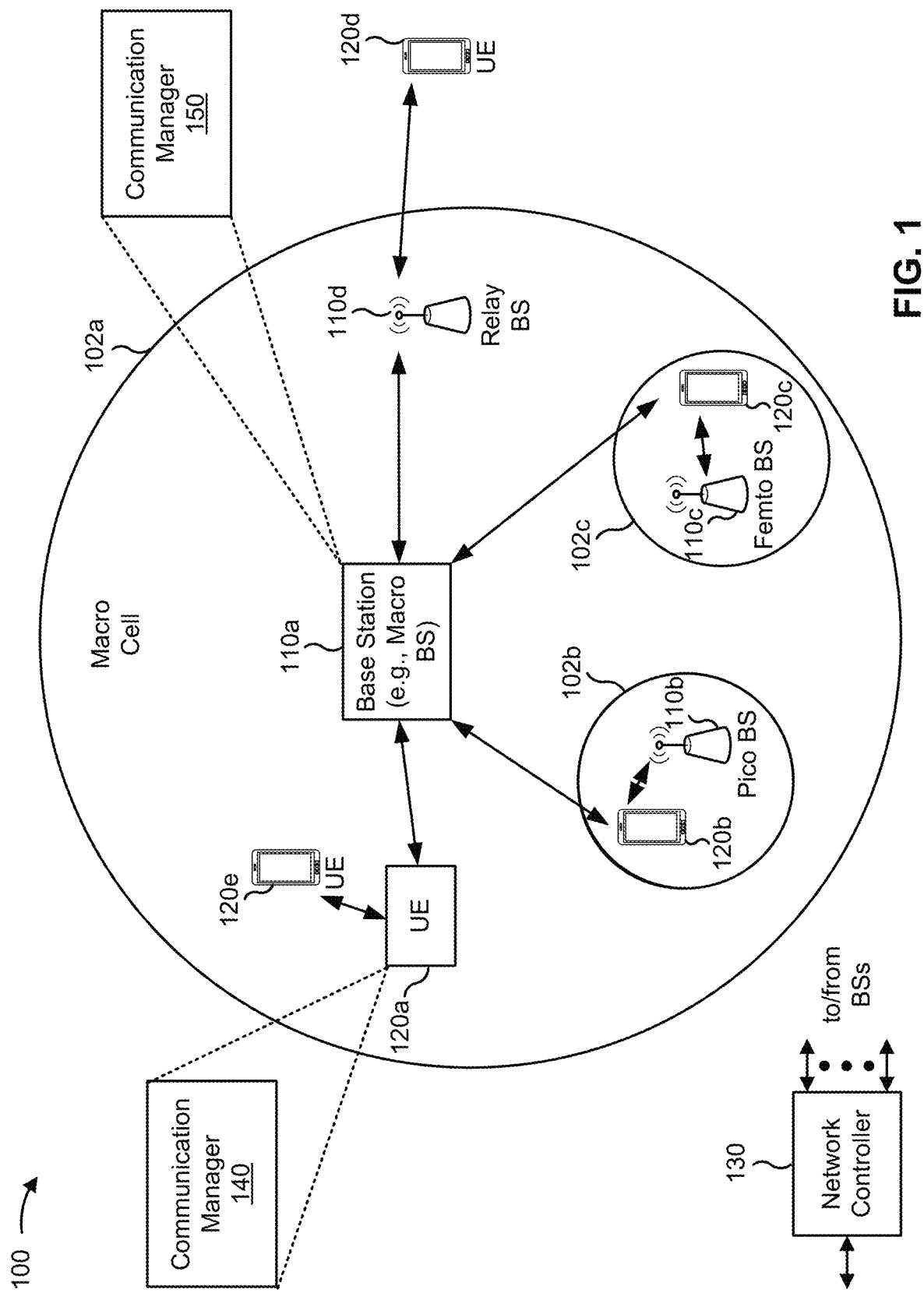
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a first dormancy indication and a second dormancy indication; and communicate in a wireless network based at least in part on associating the first dormancy indication with a first dormancy state of a first network entity in the wireless network and associating the second dormancy indication with a second dormancy state of a second network entity in the wireless network. Additionally, or alternatively, the communication manager 140 may perform one or more other operations described herein.

In some aspects, the network entity may include a communication manager 150. As described in more detail elsewhere herein, the communication manager 150 may transmit a first dormancy indication that indicates a first dormancy state of a first network entity in a wireless network and a second dormancy indication that indicates a second dormancy state of a second network entity in the wireless network, the first network entity and the second network entity associated with UE; and communicate in the wireless network based at least in part on the first dormancy state of the first network entity or the second dormancy state of the second network entity. Additionally, or alternatively, the communication manager 150 may perform one or more other operations described herein.

As indicated above, FIG. 1 is provided as an example. Other examples may differ from what is described with regard to FIG. 1.

Figure 2:
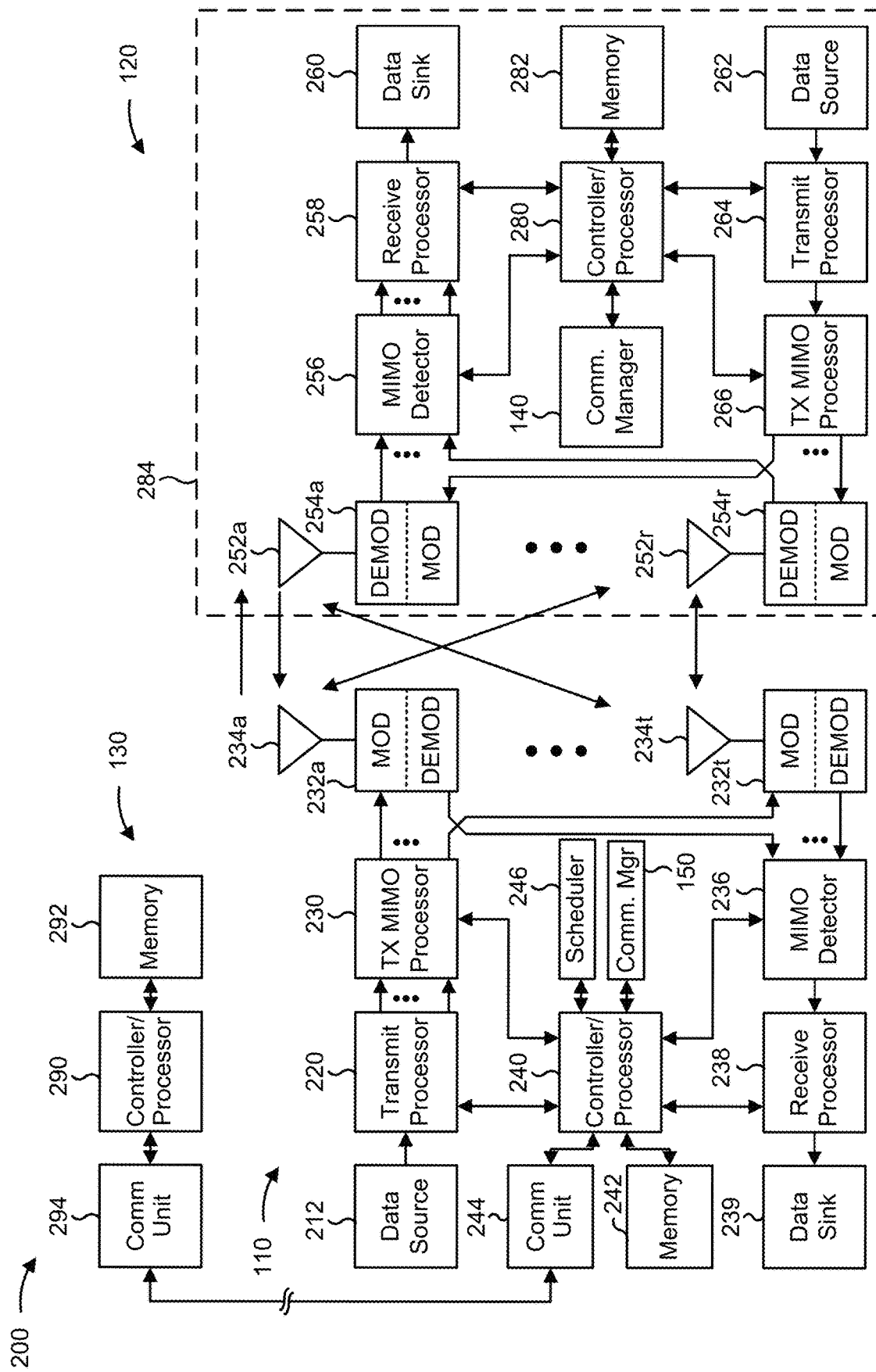
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-9).

The controller/processor 240 of the base station 110, the controller/processor 280 of the UE 120, and/or any other component(s) of FIG. 2 may perform one or more techniques associated with dormancy indications for multiple network entities, as described in more detail elsewhere herein. In some aspects, a TRP described herein is the base station 110, is included in the base station 110, or includes one or more components of the base station 110 shown in FIG. 2. The controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving a first dormancy indication and a second dormancy indication; and/or means for communicating in a wireless network based at least in part on associating the first dormancy indication with a first dormancy state of a first network entity in the wireless network and associating the second dormancy indication with a second dormancy state of a second network entity in the wireless network. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity includes means for transmitting a first dormancy indication that indicates a first dormancy state of a first network entity in a wireless network and a second dormancy indication that indicates a second dormancy state of a second network entity in the wireless network, the first network entity and the second network entity associated with a UE; and/or means for communicating in the wireless network based at least in part on the first dormancy state of the first network entity or the second dormancy state of the second network entity. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the network entity to perform operations described herein may include, for example, one or more of communication manager 140, antenna 252, modem 254, MIMO detector 256, receive processor 258, transmit processor 264, TX MIMO processor 266, controller/processor 280, or memory 282

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
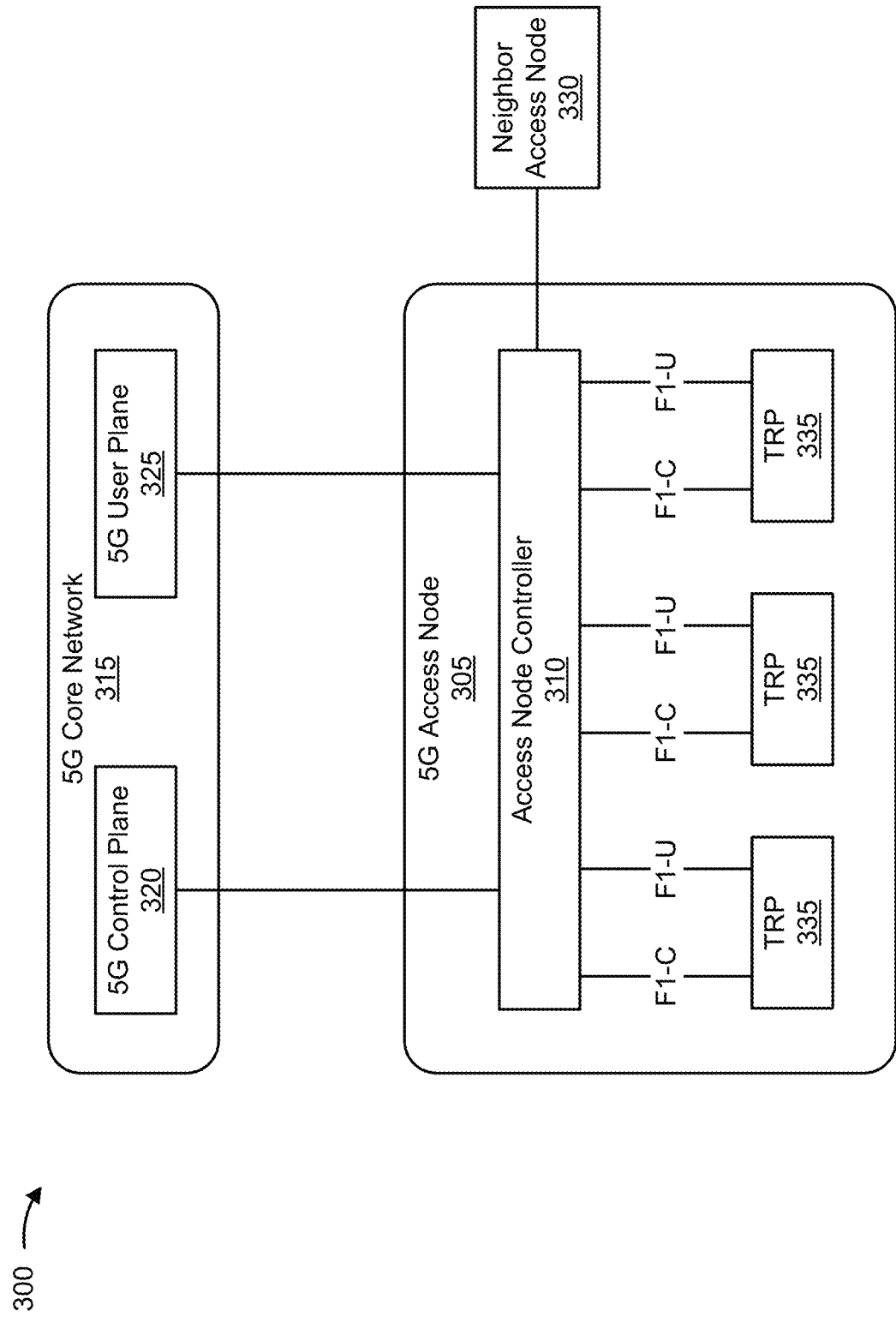
FIG. 3 illustrates an example logical architecture of a distributed radio access network (RAN), in accordance with the present disclosure.

FIG. 3 illustrates an example logical architecture of a distributed RAN 300, in accordance with the present disclosure.

A 5G access node 305 may include an access node controller 310. The access node controller 310 may be a central unit (CU) of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305 and/or an LTE access node) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a distributed unit (DU) of the distributed RAN 300. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, or an array.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, and/or a medium access control (MAC) layer may be configured to terminate at the access node controller 310 or at a TRP 335.

In some aspects, multiple TRPs 335 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

As indicated above, FIG. 3 is provided as an example. Other examples may differ from what was described with regard to FIG. 3.

Figure 4:
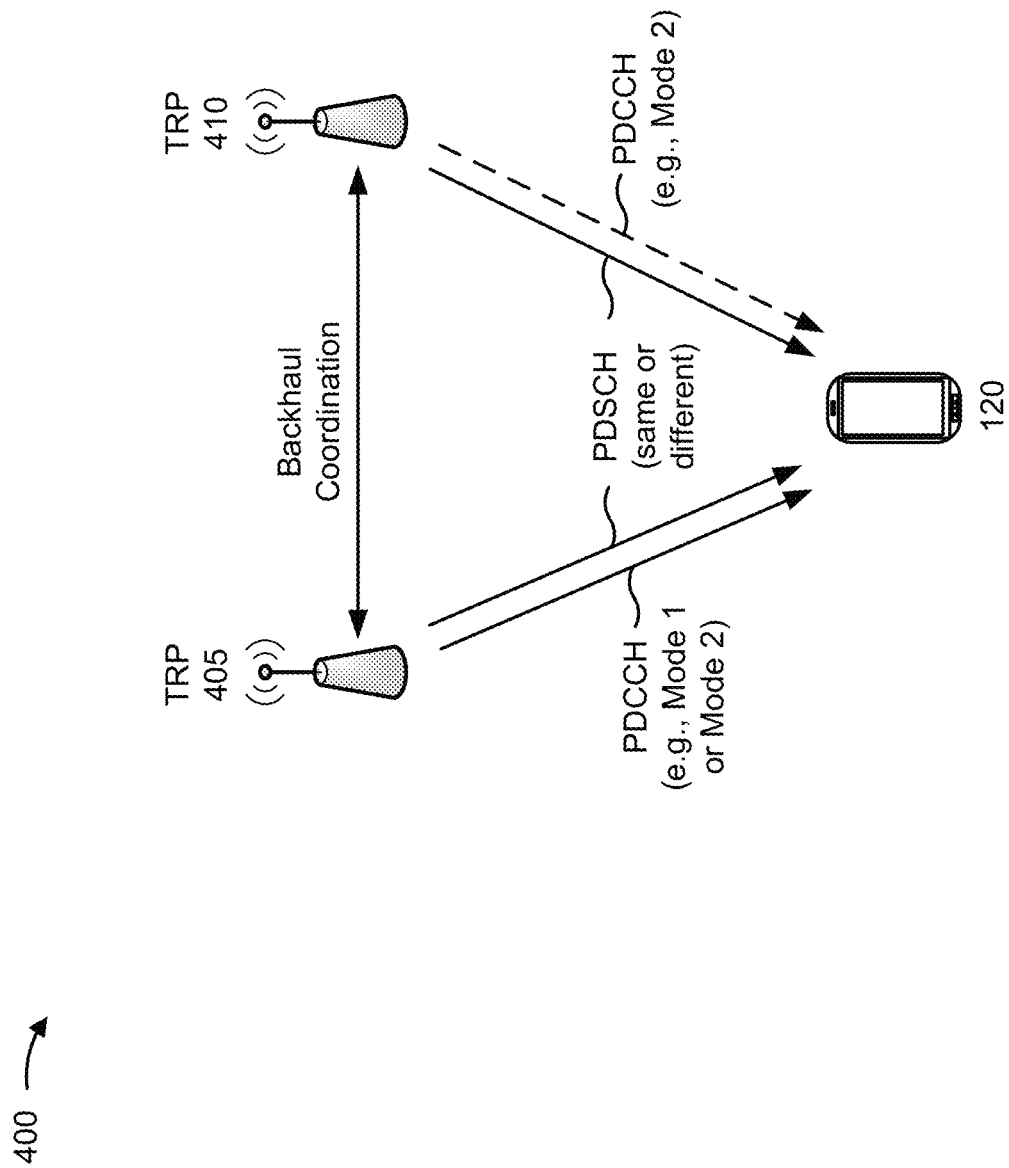
FIG. 4 is a diagram illustrating an example of multiple transmission reception point (TRP) communication, in accordance with the present disclosure.

FIG. 4 is a diagram illustrating an example 400 of multiple transmission/reception point (multi-TRP, mTRP) communication (sometimes referred to as multi-panel communication), in accordance with the present disclosure. As shown in FIG. 4, multiple TRPs (shown as TRP 405 and TRP 410) may communicate with the same UE 120. The TRP 405 and/or the TRP 410 may correspond to a TRP 335 described above in connection with FIG. 3.

The multiple TRPs (e.g., the TRP 405 and the TRP 410) may communicate with the same UE 120 in a coordinated manner (e.g., using coordinated multipoint transmissions) to improve reliability and/or increase throughput. The TRP 405 and the TRP 410 may coordinate such communications via an interface (e.g., a backhaul interface and/or an access node controller 310 between the TRPs). The interface may have a smaller delay and/or higher capacity when the TRP 405 and the TRP 410 are co-located at the same base station 110 (e.g., when the TRP 405 and the TRP 410 are different antenna arrays or panels of the same base station 110), and may have a larger delay and/or lower capacity (as compared to co-location) when the TRP 405 and the TRP 410 are located at different base stations 110. The TRP 405 and the TRP 410 may communicate with the UE 120 using different QCL relationships (e.g., different TCI states), different demodulation reference signal (DMRS) ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs (e.g., TRP 405 and the TRP 410) may transmit communications to the UE 120 on the same PDSCH. For example, a communication may be transmitted using a single codeword with different spatial layers for each TRP (e.g., where one codeword maps to a first set of layers transmitted by the TRP 405 and maps to a second set of layers transmitted by the TRP 410). As another example, a communication may be transmitted using multiple codewords, where different codewords are transmitted by the TRP 405 and the TRP 410 (e.g., using different sets of layers). In either case, the TRP 405 and the TRP 410 may use different QCL relationships (e.g., different TCI states) for different DMRS ports corresponding to different layers. For example, the TRP 405 may use a first QCL relationship or a first TCI state for a first set of DMRS ports corresponding to a first set of layers, and the TRP 410 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1). The Mode 1 multi-TRP transmission mode may alternatively or additionally be referred to as a single-downlink control information (sDCI) multi-TRP (mTRP) mode (e.g., an sDCI mTRP mode).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by the TRP 405, and a second PDCCH may schedule a second codeword to be transmitted by the TRP 410. Furthermore, first DCI (e.g., transmitted by the TRP 405) may schedule a first PDSCH communication associated with a first set of DMRS ports with a first QCL relationship (e.g., indicated by a first TCI state) for the TRP 405, and second DCI (e.g., transmitted by the TRP 410) may schedule a second PDSCH communication associated with a second set of DMRS ports with a second QCL relationship (e.g., indicated by a second TCI state) for the TRP 410. In this case, DCI (e.g., having DCI format 1_0 or DCI format 1_1) may indicate a corresponding TCI state for a TRP (e.g., the TRP 405 or the TRP 410) corresponding to the DCI. The TCI field of a DCI indicates the corresponding TCI state (e.g., the TCI field of the first DCI indicates the first TCI state and the TCI field of the second DCI indicates the second TCI state). The Mode 2 multi-TRP transmission mode may alternatively or additionally be referred to as a multiple downlink control information (multi-DCI, mDCI) mTRP mode (e.g., an mDCI mTRP mode).

The demand for services provided by a cellular network continues to increase as more and more devices access the cellular network. In some aspects, adding network entities (e.g., base stations and/or TRPs) to the cellular network may help provide the cellular network with an ability to service more devices by expanding a cellular coverage area and/or increasing a signal strength in the coverage area. However, adding the network entities may increase an operating cost associated with the cellular network. As one example, adding more network entities may increase energy consumption in the cellular network and, subsequently, increase the operating cost of the cellular network. To illustrate, a first primary cell (PCell) or secondary cell (SCell) that includes two active TRPs (e.g., the TRP 405 and the TRP 410) may consume more energy relative to a second PCell or SCell that includes one active TRP and one dormant TRP. "Dormant TRP" may denote a TRP operating in a dormant and/or idle state with reduced functionality relative to an active TRP. For example, a dormant TRP may transmit less information and/or transmit information less frequently (e.g., using a PDCCH). Transitioning a TRP or another network entity into a dormant mode may help reduce energy consumption in the cellular network and reduce operating costs. As one example, a network entity in the cellular network may determine to dynamically transition a TRP into a dormant mode during time periods that historically have reduced demand for cellular services (e.g., 12:00 AM to 6:00 AM) to reduce energy consumption and dynamically transition the TRP to an active mode during time periods that historically have increased demand for cellular services (e.g., 6:00 AM to 12:00 AM).

In some aspects, a first network entity (e.g., a base station or a first TRP) may indicate dormancy state information of one or more network entities (e.g., the first TRP 405 and/or the second TRP 410) to a UE. The dormancy state information may indicate a dormancy state associated with a network entity (e.g., whether the network entity is operating in, or transitioning to, an active mode or a dormant mode). Based at least in part on receiving the dormancy state information, the UE may monitor a PDCCH associated with a dormant network entity less frequently relative to a PDCCH associated with an active network entity and reduce energy consumption at the UE. As another example, the UE may refrain from monitoring for PDSCH transmissions associated with the dormant network entity relative to PDSCH transmissions associated with the active network entity, which may also reduce energy consumption at the UE.

In some aspects, the first network entity may jointly indicate dormancy state information associated with multiple network entities. The joint indication of dormancy state information may cause the UE to misinterpret which network entity has transitioned into a dormant mode or an active mode. As one example, the first network entity may indicate the dormancy state information using a field in DCI that includes N bits, where N is an integer associated with a number of multiple network entities (e.g., TRPs) associated with the UE. Each bit of the N bits in the DCI field may indicate a dormancy state (e.g., a dormant mode or an active mode) of a respective TRP associated with the UE. To illustrate, and with regard to the example 400, the first network entity may transmit N=2 bits in DCI to indicate dormancy state information associated with the TRP 405 and the TRP 410. However, without clarification, the UE may incorrectly interpret the bits in DCI and, subsequently, the dormancy states of the TRP 405 and the TRP 410. For example, the UE may incorrectly associate an active mode to a dormant TRP or a dormant mode to an active TRP. As one example, the UE may interpret the dormancy indication information based at least in part on a TCI state that is common to both the TRP 405 and the TRP 410, as further described with regard to FIG. 5. The misinterpretation by the UE may result in disrupted and/or lost communications between the first network entity and the UE, such as by the UE monitoring a PDCCH and/or PDSCH of a dormant TRP instead of an active TRP.

Some techniques and apparatuses described herein provide dormancy indications for multiple network entities. In some aspects, a UE may receive a first dormancy indication and a second dormancy indication. As one example, the UE may receive the multiple dormancy indications from a network entity, such as a TRP and/or a base station. Based at least in part on receiving the multiple dormancy indications, the UE may communicate in a wireless network by associating the first dormancy indication with a first dormancy state of a first network entity in the wireless network and associating the second dormancy indication with a second dormancy state of a second network entity in the wireless network. In some aspects, the UE may associate the first dormancy indication with the first network entity and the second dormancy indication with the second network entity based at least in part on a dormancy indication configuration, as further described with regard to FIG. 5. The dormancy indication configuration may provide the UE with a specific mapping between one or more dormancy indications and one or more network entities. The specific mapping may enable the UE to correctly identify a dormancy state for each respective network entity associated with the dormancy indications and mitigate disrupted and/or lost communications between the first network entity and the UE.

In some aspects, a network entity may transmit a first dormancy indication that indicates a first dormancy state of a first network entity in a wireless network and a second dormancy indication that indicates a second dormancy state of a second network entity in the wireless network. As one example, the network entity may transmit the first dormancy indication and the second dormancy indication directly or indirectly (e.g., through another network entity) to a UE associated with the first network entity and the second network entity. In some aspects, the network entity may associate the first dormancy indication with the first network entity and the second dormancy indication with the second network entity based at least in part on a dormancy indication configuration, as further described with regard to FIG. 5. The network entity may transmit information in the wireless network (e.g., to the UE) based at least in part on the first dormancy state of the first network entity or the second dormancy state of the second network entity. In some aspects, the network entity is the first network entity or the second network entity associated with the UE. By using a dormancy indication configuration, the network entity may indicate dormancy state information to a UE such that the UE may correctly identify a dormancy state for each respective network entity associated with the dormancy indications. Using the dormancy indication configuration helps to mitigate disrupted and/or lost communications between the network entity and the UE. As indicated above, FIG. 4 is provided as an example. Other examples may differ from what is described with respect to FIG. 4.

Figure 5:
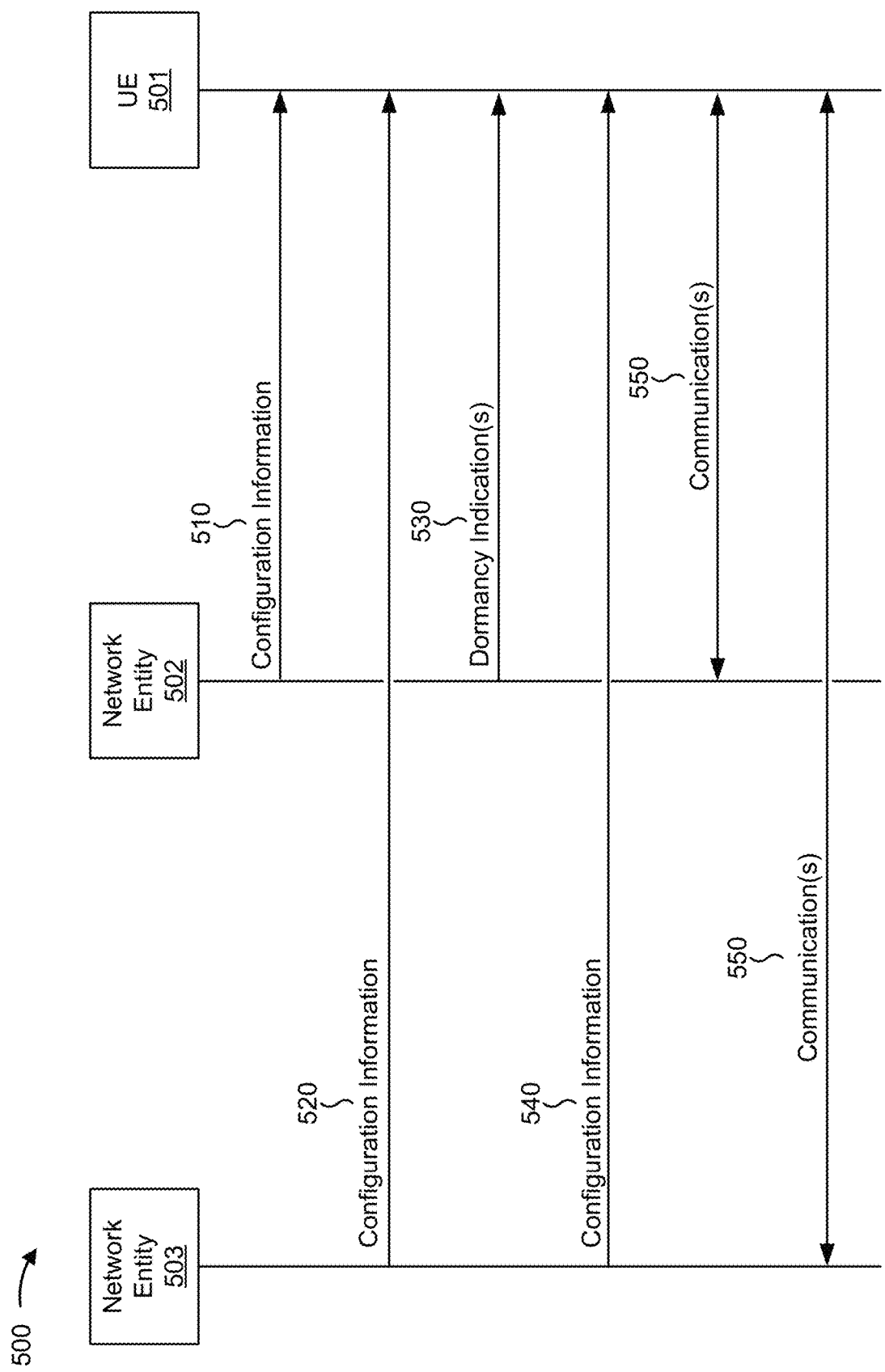
FIG. 5 is a diagram illustrating an example of a wireless communication process between a UE, a first network entity, and a second network entity in a wireless communication network, in accordance with the present disclosure.

FIG. 5 is a diagram illustrating an example 500 of a wireless communication process between a UE 501 (e.g., a UE 120 or an apparatus 800), a first network entity 502 (e.g., a base station 110, the TRP 405, the TRP 335, or an apparatus 900), and a second network entity 503 (e.g., another base station 110, the TRP 410, the TRP 335, or an apparatus 900) in a wireless communication network, in accordance with the present disclosure.

As shown by reference number 510, the first network entity 502 may transmit, and the UE 501 may receive, first configuration information associated with communicating in a wireless network. Alternatively or additionally, as shown by reference number 520, the second network entity 503 may transmit, and the UE 501 may receive, second configuration information associated with communicating in the wireless network. For clarity, the example 500 shows the first network entity and the second network entity each transmitting configuration information (e.g., the first configuration information and/or the second configuration information as a single transmission), but in other examples, the first network entity and/or the second network entity may communicate the configuration information to the UE 501 using multiple transmissions and/or messages. For example, the first network entity 502 and/or the second network entity 503 may transmit the configuration information using any combination of one or more radio resource control (RRC) messages, one or more medium access control (MAC) control elements (CEs), and/or downlink control information (DCI).

In some aspects, the first network entity may be a first TRP (e.g., the TRP 405) and the second network entity may be a second TRP (e.g., the TRP 410). The UE 501 may communicate with the first network entity and the second network entity based at least in part on Mode 1 communications (e.g., an sDCI mTRP mode) or Mode 2 communications (e.g., an mDCI mTRP mode). The first network entity and the second network entity may be operating in a PCell or an SCell.

The first network entity 502 and/or the second network entity 503 may indicate, in the configuration information, any combination of parameters, settings, state information, frequencies, and/or time slots, associated with wireless communications to and/or from the UE 501. As one example of configuration information, the first network entity 502 may indicate a plurality of TCI states to the UE using one or more RRC messages. In some aspects, the network entity may indicate an identifier (ID) for each TCI state (e.g., a TCI state ID). Various MAC CEs may be used by the network entity to indicate, activate, and/or deactivate one or more of the TCI states communicated via the RRC message. As one example, the network entity may use a first MAC CE to indicate a TCI state associated with a physical control channel (PUCCH) transmission to a UE. Alternatively or additionally, the network entity may use a second MAC CE to indicate a mapping of a subset of TCI states (e.g., from the plurality of TCI states) to a TCI codepoint.

A codepoint may denote a subset of elements from a group of elements, where the subset of elements may be formed using non-contiguous and/or contiguous elements from the group. To illustrate, assume the group of elements consists of an array of M elements, where M is an integer and the array may be accessed based at least in part on indices ranging from 0 to (M−1). As one example, and assuming M=50, the subset of elements forming a codepoint may consist of array elements that are non-contiguous and/or contiguous, such as array elements addressable as: array [1], array [20], array [33], and element [49]. In some aspects, the codepoint may have relative indices such that codepoint [0]=array [1], codepoint [1]=array [20], codepoint [2]=array [33], and codepoint [3]=array [49].

With regard to the plurality of TCI states, the second MAC CE may map a subset of TCI states to TCI codepoint indices and/or TCI codepoint elements. In some aspects, each TCI codepoint element may include two TCI states as further described. When operating in an sDCI mTRP mode, the first network entity 502 may indicate a first UE-specific PDSCH MAC CE that activates and/or deactivates TCI states for a first TCI codepoint associated with a PDSCH of the first network entity, and a second UE-specific PDSCH MAC CE that activates and/or deactivates TCI states for a second TCI codepoint associated with a PDSCH of the second network entity. The first network entity may configure the first TCI codepoint and the second TCI codepoint with one or more TCI states that are the same. Thus, a same TCI state may be associated with the first network entity 502 and the second network entity 503.

Alternatively or additionally, the first network entity 502 and/or the second network entity 503 may indicate, in the configuration information, a respective control resource set (CORESET) pool index (CORESETPoolIndex). A CORESET may denote a set of air interface resources (e.g., frequency partitions and/or time partitions) and a set of parameters that may be used for the respective PDCCH. To illustrate, when operating using Mode 2 communications (e.g., an mDCI mTRP mode), each network entity may utilize a different CORESET for downlink transmissions. A CORESETPoolIndex may denote the particular resources of the CORESET associated with the network entity. In some aspects, the UE 501 may use the CORESETPoolIndex to identify the respective network entity and/or the one or more resources used by the respective network entity for downlink transmissions.

In some aspects, the first network entity 502 and/or the second network entity 503 may indicate, in the configuration information, a dormancy indication configuration. For example, the first network entity 502 and/or the second network entity 503 may transmit the dormancy indication configuration using one or more RRC messages, one or more MAC CEs, and/or DCI. A dormancy indication configuration may denote a mapping and/or interpretation of dormancy state information with regard to one or more network entities. The first network entity 502 and the second network entity 503 may communicate with one another using a backhaul link and/or interface (as further described with regard to FIG. 4) to coordinate and/or synchronize a dormancy state and/or a dormancy indication configuration. While the example 500 shows the dormancy indication configuration being transmitted by the first network entity 502 and/or the second network entity 503 as part of the configuration information, other examples may use a fixed and/or pre-configured dormancy indication configuration that is not explicitly communicated between the first network entity 502, the second network entity 503, and/or the UE 501. A fixed and/or pre-configured dormancy indication configuration may denote a static dormancy indication configuration that has a shared and/or common definition between at least two devices.

As one example of a dormancy indication configuration, and with regard to the above example of N=2 bits of the dormancy state field in DCI, the dormancy indication configuration may indicate a first interpretation of the N=2 bits that associates a first bit of the N=2 bits (e.g., a bit at position 0 of the dormancy state field in the DCI) to the first network entity 502 and a second bit of the N=2 bits (e.g., a bit at position 1 of the dormancy state field in the DCI) to the second network entity 503. Alternatively, the dormancy indication configuration may indicate a second interpretation of the N=2 bits that associates the first bit at position 0 to the second network entity 503 and the second bit at position 1 to the first network entity 502. A dormancy indication configuration transmitted as part of the configuration information may enable a network entity to dynamically switch between the first interpretation of the N=2 bits and the second interpretation of the N=2 bits. Alternatively, a network entity and/or the UE 501 may use a fixed or pre-configured dormancy indication configuration that is not transmitted between devices, where the fixed or pre-configured dormancy indication configuration may define the N=2 bit interpretation as the first interpretation or the second interpretation.

In some aspects, the first network entity 502 and/or the second network entity 503 may transmit the dormancy indication configuration prior to sending the dormancy state information, as shown by the reference number 510 and/or the reference number 520. For example, the first network entity 502 and/or the second network entity 503 may indicate the dormancy indication configuration using a field and/or information element (IE) included in an RRC message or a field of a MAC CE. Alternatively, the first network entity 502 and/or the second network entity 503 may transmit the dormancy indication configuration in DCI that also includes the dormancy state information as further described with regard to reference number 530.

The dormancy indication configuration may include a reserved bit interpretation configuration associated with a reserved bit in a TCI codepoint element for interpreting dormancy state information. For example, each TCI codepoint element in a TCI codepoint may include a serving cell ID, a bandwidth part ID, a reserved bit, and N TCI states (e.g., each TCI codepoint element includes two TCI state entries for N=2). In some aspects, a value of the reserved bit may indicate how to interpret the N bits of the dormancy state field in DCI (e.g., the first interpretation or the second interpretation as further described above), while the dormancy indication configuration may include the reserved bit interpretation configuration (e.g., how to interpret each value of the reserved bit). For example, the dormancy state information may indicate that a first value (e.g., a "0" or a "1") for the reserved bit indicates to use the first interpretation of the N bits in the dormancy state field and that a second value (e.g., "1" or "0") for the reserved bit indicates to use the second interpretation of the N bits in the dormancy state field. A network entity may transmit a dormancy indication configuration that indicates the reserved bit interpretation configuration as part of the configuration information, or the dormancy indication configuration that indicates the reserved bit interpretation configuration may be a fixed or pre-configured dormancy indication configuration.

In some aspects, the dormancy indication configuration may indicate to interpret the dormancy state information based at least in part on a TCI codepoint index value. To illustrate, the dormancy indication configuration may specify a first range of values (e.g., 0-3) and/or an index value threshold (e.g., 3) and indicate to interpret dormancy state information based at least in part on the first range of values and/or the index value threshold. For instance, the dormancy indication configuration may specify to use the first interpretation based at least in part on the TCI codepoint index value being included in the first range of values and/or the TCI codepoint index value satisfying the index value threshold (e.g., being below the index value threshold, being above the index value threshold, and/or being at the index value threshold). Alternatively or additionally, the dormancy indication configuration may specify a second range of values (e.g., 4-7) and indicate to interpret dormancy state information using the second interpretation and based at least in part on the TCI codepoint index value being included in the second range of values and/or failing to satisfy the index value threshold. In some aspects, the dormancy indication configuration may indicate the first range of values explicitly and indicate the second range of values implicitly (e.g., remaining index values that were not indicated in the first range of values are implicitly the second range of values). As another example, the dormancy indication configuration may indicate to interpret the dormancy state information based at least in part on whether the TCI codepoint index value is odd or even. For instance, the dormancy indication configuration may indicate to interpret the dormancy state information using the first interpretation based at least in part on when the TCI codepoint index value is even and the second interpretation based at least in part on when the TCI codepoint index value is odd (or vice versa).

Similar to the TCI codepoint index value, the dormancy indication configuration may indicate to interpret the dormancy state information based at least in part on a TCI state ID value and/or a location of the TCI state value in a TCI codepoint element. To further explain, each TCI codepoint element may include two entries for TCI state IDs: a first entry at position 0 and a second entry at position 1. In some aspects, a MAC CE layer of a network entity (e.g., the first network entity 502 or the second network entity 503) may configure each TCI codepoint element to include a first TCI state ID with an odd value and a second TCI state ID with an even value. In some aspects, the dormancy indication configuration may indicate to (1) interpret the dormancy state information using the first interpretation based at least in part on identifying that the even TCI state ID value resides in position 0 of the TCI codepoint element and (2) interpret the dormancy state information using the second interpretation based at least in part on the even TCI state ID value residing in position 1 of the TCI codepoint element (or vice versa). Alternatively, the dormancy interpretation configuration may indicate to interpret the dormancy state information based at least in part on a position of the odd TCI state value in the TCI codepoint element. Thus, the dormancy indication configuration may be based at least in part on a location of a TCI state ID value (e.g., a position of an odd value or an even value).

In some aspects, the dormancy indication configuration may be based at least in part on a CORESETPoolIndex value. To illustrate, when the first network entity 502 and the second network entity 503 communicate with the UE 501 based at least in part on Mode 2 communications (e.g., an mDCI mTRP mode), each network entity may be associated with a particular CORESETPoolIndex. To illustrate, the first network entity 502 may be associated with a first CORESETPoolIndex (e.g., CORESETPoolIndex 0) and the second network entity 503 may be associated with a second CORESETPoolIndex 1. In some aspects, the dormancy indication configuration may indicate to interpret the dormancy state information based at least in part on an ordering of the CORESETPoolIndex values associated with the first network entity 502 and the second network entity 503. For example, and with regard to N=2 bits as further described above, the dormancy indication configuration may indicate to associate a first bit at position 0 of the dormancy state field in the DCI with the first network entity 502 based at least in part on the first CORESETPoolIndex associated with the first network entity 502. Alternatively or additionally, the dormancy indication configuration may indicate to associate a second bit at position 1 of the dormancy state field in the DCI to the second network entity 503 based at least in part on the second CORESETPoolIndex associated with the second network entity 503. A dormancy indication configuration that indicates how to interpret the dormancy state information based at least in part on a CORESETPoolIndex may be transmitted as part of the configuration information or may be a fixed and/or pre-configured dormancy indication configuration that is not transmitted between devices.

As shown by reference number 530, the first network entity 502 may transmit, and the UE 501 may receive, one or more dormancy indications. Alternatively or additionally, as shown by reference number 540, the second network entity 503 may transmit, and the UE 501 may receive, one or more dormancy indications. As one example, the first network entity 502, the second network entity 503, and the UE 501 may communicate in the wireless network based at least in part on Mode 1 communications (e.g., in an sDCI mTRP mode) in which the first network entity 502 may transmit information to the UE 501 using PDCCH (e.g., and the second network entity 503 does not transmit information to the UE 501 using PDCCH). In other examples, the first network entity 502, the second network entity 503, and the UE 501 may communicate in the wireless network based at least in part on Mode 2 communications (e.g., in an mDCI mTRP mode) in which the first network entity 502 and the second network entity 503 transmit information to the UE 501 based at least in part on using respective PDCCHs and respective CORESETs. When operating using Mode 2 communications, the first network entity 502 and the second network entity 503 may communicate over a backhaul link to coordinate and/or synchronize which network entity may transition into a dormant mode. Alternatively or additionally, the first network entity 502 and the second network entity 503 may communicate over the backhaul link to coordinate and/or synchronize dormancy state information. The first network entity 502 or the second network entity 503 may transmit the dormancy state information based at least in part on which network entity may remain in an active mode and which network entity may transition to a dormant mode. To illustrate, the network entity that remains in the active mode may transmit the dormancy state information.

In some aspects, the first network entity 502 or the second network entity 503 may transmit the dormancy state information in a dormancy state field in DCI. As further described above, the first network entity 502 or the second network entity 503 may configure the dormancy state information based at least in part on a dormancy indication configuration (e.g., a dynamic dormancy indication configuration, a fixed dormancy indication configuration, or a pre-configured dormancy indication configuration). To illustrate, the first network entity 502 may position a first dormancy state associated with the first network entity in position 0 of the DCI field and a second dormancy state associated with the second network entity in position 1 of the DCI field (or vice versa) based at least in part on the dormancy indication configuration.

In some aspects, the first network entity 502 and/or the second network entity 503 may indicate the dormancy indication configuration in a same transmission as the dormancy state information. As one example, DCI that includes the dormancy state information may also indicate the dormancy indication configuration. To illustrate, the DCI and/or a particular DCI format may include a dormancy indication configuration field (e.g., a third bit with regard to N=2) that may be a static field or a dynamic field. "Static field" may denote a field always present in the DCI and/or the particular DCI format. "Dynamic field" may denote a first field that may be interpreted in different ways based at least in part on a state or value of a second field. To illustrate, the DCI may include a first field that indicates a dormancy indication configuration based at least in part on a value of a second field or bit (e.g., a value of "1" in the second field indicates to interpret the first field as a dormancy indication configuration field).

When the first network entity 502, the second network entity 503, and the UE 501 communicate in the wireless network based at least in part on using Mode 2 communications, the dormancy state information may include a single bit (e.g., N–1 bits) that indicates a dormancy state of the network entity associated with the second CORESET-PoolIndex value. For instance, the first network entity 502 may transmit the single bit dormancy state information. Based at least in part on receiving the transmission from the first network entity 502, the UE 501 may assume that the first network entity 502 is operating in an active mode and the single bit dormancy state information in the DCI is associated with the second network entity 503.

As shown by reference number 550, the first network entity 502 and the UE 501 may communicate in the wireless network based at least in part on the dormancy state information. Alternatively or additionally, and as shown by reference number 550, the second network entity 503 and the UE 501 may communicate in the wireless network based at least in part on the dormancy state information. While the example 500 shows that the UE 501 may communicate in the wireless network with the first network entity 502 and/or the second network entity 503 based at least in part on the dormancy state information, in some aspects, the UE 501 may refrain from communicating with the first network entity 502 and the second network entity 503 based at least in part on the dormancy state information. To illustrate, when the first network entity 502, the second network entity 503, and the UE 501 communicate based at least in part on using an SCell, the dormancy state information may indicate that the first network entity 502 and the second network entity 503 are transitioning into a dormant mode. When the first network entity 502 and the second network entity 503 transition to a dormant mode, the UE 501 may refrain from communicating with first network entity 502 and the second network entity 503. When communicating in a PCell, at least one of the first network entity 502 and the second network entity 503 may be required to remain in an active mode.

In some aspects, communicating based at least in part on the dormancy state information may include the UE 501 dynamically switching PDSCH reception based at least in part on the dormancy state information. For example, when the dormancy state information indicates that the second network entity 503 is transitioning into a dormant mode, the UE 501 may refrain from monitoring the PDSCH associated with the second network entity 503 (e.g., when operating in Mode 1 or Mode 2) and/or refrain from monitoring the PDCCH associated with the second network entity 503 (e.g., when operating in Mode 2). Alternatively or additionally, communicating based at least in part on the dormancy state information may include the UE 501 dynamically switching PDCCH monitoring and/or reception. To illustrate, and with regard to the dormancy state information indicating that the second network entity 503 is transitioning into the dormant mode, the UE 501 may refrain from monitoring the PDCCH associated with the second network entity 503 and/or refrain from recovering communication repetitions (e.g., repetitive PDCCH) based on a CORESET associated with the second network entity 503. Further, the first network entity 502 and/or the second network entity may transmit information selectively on a respective PDCCH and/or PDSCH based at least in part on the first dormancy indication or the second dormancy indication.

By using a dormancy indication configuration, a first network entity may indicate dormancy state information associated with multiple network entities to a UE and mitigate ambiguity associated with which dormancy state is associated with which network entity. The dormancy indication configuration may enable the UE to correctly identify a dormancy state for a network entity out of multiple network entities. By correctly identifying the dormancy state, the UE may monitor and receive communications from an active network entity, which may help mitigate disrupted and/or lost communications caused by the UE failing to monitor the active network entity.

As indicated above, FIG. 5 is provided as an example. Other examples may differ from what is described with respect to FIG. 5.

Figure 6:
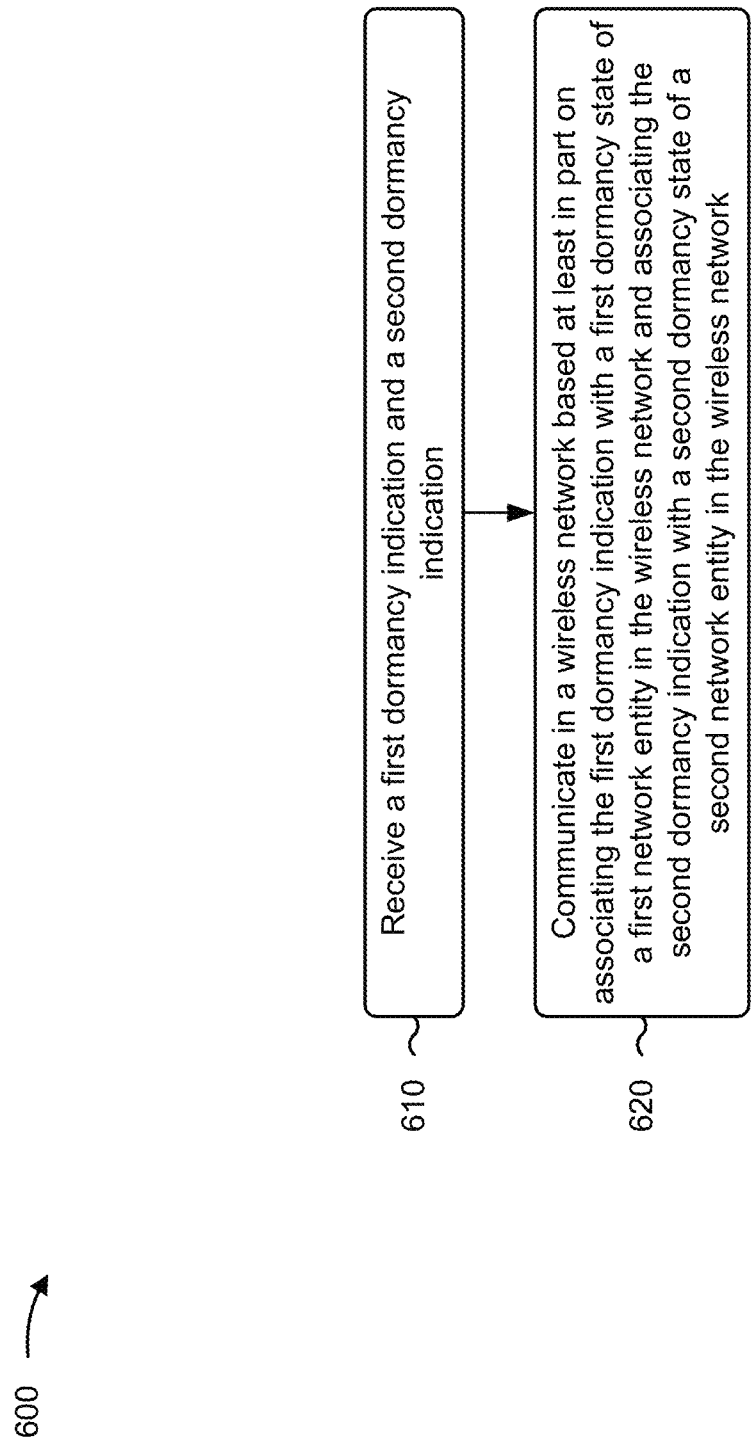
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with dormancy indications for multiple network entities.

As shown in FIG. 6, in some aspects, process 600 may include receiving a first dormancy indication and a second dormancy indication (block 610). For example, the UE (e.g., using communication manager 140 and/or reception component 802, depicted in FIG. 6) may receive a first dormancy indication and a second dormancy indication, as described above.

As further shown in FIG. 6, in some aspects, process 600 may include communicating in a wireless network based at least in part on associating the first dormancy indication with a first dormancy state of a first network entity in the wireless network and associating the second dormancy indication with a second dormancy state of a second network entity in the wireless network (block 620). For example, the UE (e.g., using communication manager 140 and/or dormancy manager component 808, depicted in FIG. 8) may communicate in a wireless network based at least in part on associating the first dormancy indication with a first dormancy state of a first network entity in the wireless network and associating the second dormancy indication with a second dormancy state of a second network entity in the wireless network, as described above. As one example, using a dormancy indication configuration may enable the UE to correctly identify a dormancy state for each respective network entity associated with the dormancy indications. Using the dormancy indication configuration may help mitigate disrupted and/or lost communications between the network entity and the UE.

Process 600 may include additional aspects, such as any single aspect or any combination of aspects described below and/or in connection with one or more other processes described elsewhere herein.

In a first aspect, receiving the first dormancy indication and the second dormancy indication further comprises receiving the first dormancy indication and the second dormancy indication as a first bit and a second bit in DCI. The inclusion of bits in DCI to indicate dormancy state information may enable the UE to quickly receive the dormancy state information with less air interface resources relative to other communication mechanisms.

In a second aspect, alone or in combination with the first aspect, process 600 includes associating the first dormancy indication with the first network entity and the second dormancy indication with the second network entity based at least in part on a fixed dormancy indication mapping associated with the first bit and the second bit.

In a third aspect, alone or in combination with one or more of the first and second aspects, the fixed dormancy indication mapping indicates a first dormancy mapping in which the first bit is associated with the first dormancy state of the first network entity and the second bit is associated with the second dormancy state of the second network entity, or a second dormancy mapping in which the first bit is associated with the second dormancy state of the second network entity and the second bit is associated with the first dormancy state of the first network entity.

In a fourth aspect, alone or in combination with one or more of the first through third aspects, process 600 includes receiving an indication of a TCI codepoint element, and determining a dormancy indication configuration associated with the first bit and the second bit based at least in part on a value of a reserved bit associated with the TCI codepoint element. The use of the reserved bit enables the UE to use existing data structures (e.g., a TCI codepoint element data structure) to receive dormancy indications and maintains backwards compatibility with older devices and/or software.

In a fifth aspect, alone or in combination with one or more of the first through fourth aspects, process 600 includes receiving, prior to receiving the first dormancy indication and the second dormancy indication, an RRC message that indicates a reserved bit interpretation configuration associated with the reserved bit.

In a sixth aspect, alone or in combination with one or more of the first through fifth aspects, the dormancy indication configuration indicates a first bit interpretation in which the first bit is associated with the first network entity and the second bit is associated with the second network entity, or a second bit interpretation in which the first bit is associated with the second network entity and the second bit is associated with the first network entity.

In a seventh aspect, alone or in combination with one or more of the first through sixth aspects, process 600 includes receiving a third bit in the DCI that indicates a dormancy indication configuration associated with the first bit and the second bit.

In an eighth aspect, alone or in combination with one or more of the first through seventh aspects, process 600 includes receiving an indication of a TCI state ID, and determining a dormancy indication configuration associated with the first bit and the second bit based at least in part on a value of the TCI state ID.

In a ninth aspect, alone or in combination with one or more of the first through eighth aspects, determining the dormancy indication configuration based at least in part on the value further comprises determining the dormancy indication configuration based at least in part on whether the value is an odd value or an even value.

In a tenth aspect, alone or in combination with one or more of the first through ninth aspects, process 600 includes receiving an indication of a TCI codepoint index, and determining a dormancy indication configuration associated with the first bit and the second bit based at least in part on a value of the TCI codepoint index.

In an eleventh aspect, alone or in combination with one or more of the first through tenth aspects, determining the dormancy indication configuration further comprises determining the dormancy indication configuration based at least in part on whether the value satisfies an index value threshold.

In a twelfth aspect, alone or in combination with one or more of the first through eleventh aspects, determining the dormancy indication configuration further comprises determining the dormancy indication configuration based at least in part on whether the value is an odd value or an even value.

In a thirteenth aspect, alone or in combination with one or more of the first through twelfth aspects, process 600 includes associating the first dormancy indication with the first network entity based at least in part on a first TCI state associated with the first network entity, and associating the second dormancy indication with the second network entity based at least in part on a second TCI state associated with the second network entity.

In a fourteenth aspect, alone or in combination with one or more of the first through thirteenth aspects, process 600 includes associating the first dormancy indication with the first network entity based at least in part on a first CORESET pool index associated with the first network entity, and associating the second dormancy indication with the second network entity based at least in part on a second CORESET pool index associated with the second network entity.

In a fifteenth aspect, alone or in combination with one or more of the first through fourteenth aspects, receiving the first dormancy indication and the second dormancy indication further comprises receiving the second dormancy indication explicitly, and receiving the first dormancy indication implicitly with the second dormancy indication based at least in part on communicating with the first network entity and the second network entity using a PCell, wherein the first dormancy indication specifies that the first dormancy state of the first network entity is in an active mode and the second dormancy indication specifies the second dormancy state of the second network entity.

In a sixteenth aspect, alone or in combination with one or more of the first through fifteenth aspects, process 600 includes associating the second dormancy indication with the second network entity based at least in part on a second CORESET pool index associated with the second network entity.

In a seventeenth aspect, alone or in combination with one or more of the first through sixteenth aspects, communicating in the wireless network further comprises receiving information from the first network entity or the second network entity using a physical downlink shared channel and based at least in part on the first dormancy indication and the second dormancy indication. By using dormancy indications, the UE may preserve battery life by refraining from monitoring a physical downlink shared channel associated with a dormant network entity.

In an eighteenth aspect, alone or in combination with one or more of the first through seventeenth aspects, communicating in the wireless network further comprises receiving one or more communication repetitions from the first network entity or the second network entity using a physical downlink control channel and based at least in part on the first dormancy indication and the second dormancy indication. By using dormancy indications, the UE may preserve battery life by refraining from monitoring a communication repetition associated with a dormant network entity.

In a nineteenth aspect, alone or in combination with one or more of the first through eighteenth aspects, the first network entity is a first TRP and the second network entity is a second TRP.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
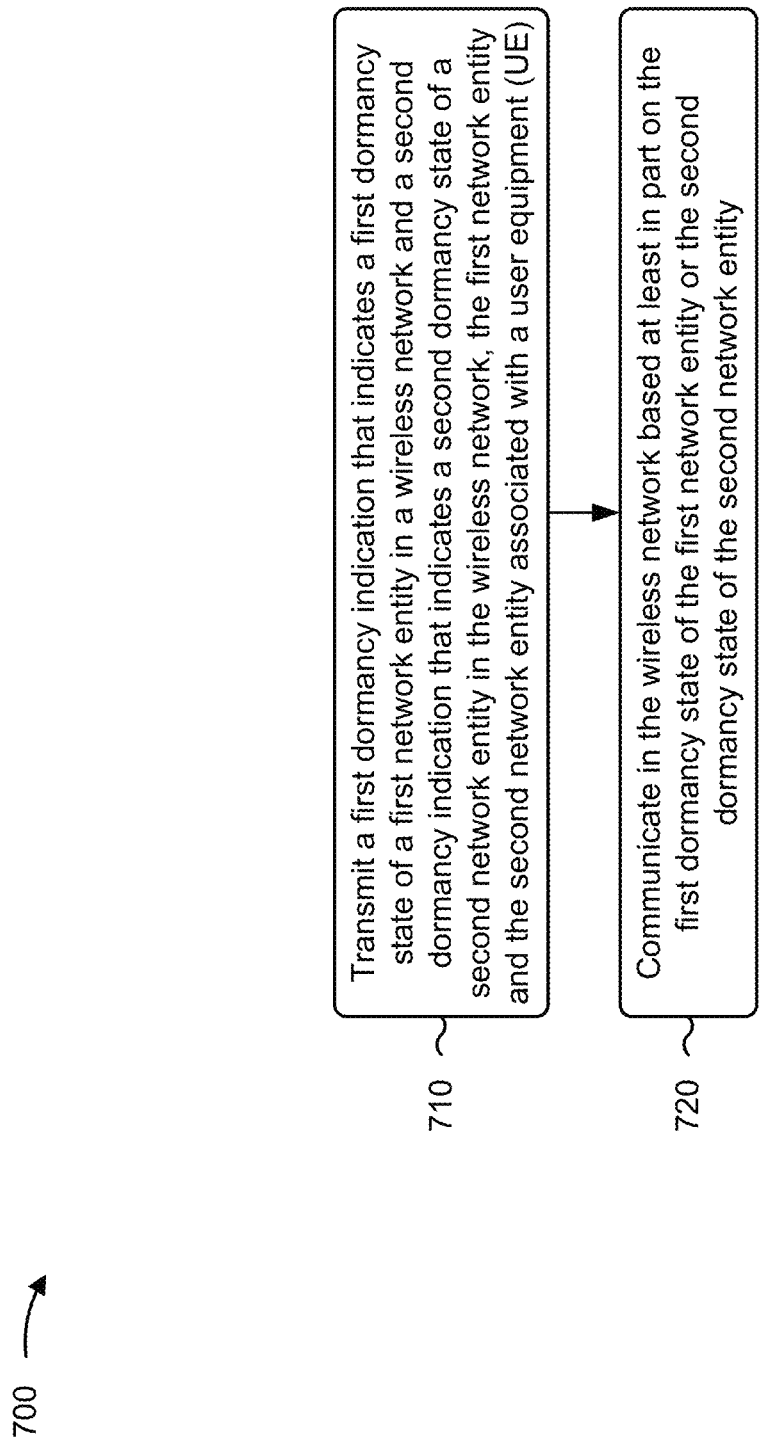
FIG. 7 is a diagram illustrating an example process performed, for example, by a network entity, in accordance with the present disclosure.

FIG. 7 is a diagram illustrating an example process 700 performed, for example, by a network entity, in accordance with the present disclosure. Example process 700 is an example where the network entity (e.g., network entity 502, the network entity 503, the base station 110, the TRP 405, the TRP 410, the TRP 335) performs operations associated with dormancy indications for multiple network entities.

As shown in FIG. 7, in some aspects, process 700 may include transmitting a first dormancy indication that indicates a first dormancy state of a first network entity in a wireless network and a second dormancy indication that indicates a second dormancy state of a second network entity in the wireless network, the first network entity and the second network entity associated with a UE (block 710). For example, the network entity (e.g., using communication manager 150 and/or transmission component 904, depicted in FIG. 9) may transmit a first dormancy indication that indicates a first dormancy state of a first network entity in a wireless network and a second dormancy indication that indicates a second dormancy state of a second network entity in the wireless network, the first network entity and the second network entity associated with a UE, as described above.

As further shown in FIG. 7, in some aspects, process 700 may include communicating in the wireless network based at least in part on the first dormancy state of the first network entity or the second dormancy state of the second network entity (block 720). For example, the network entity (e.g., using communication manager 150 and/or dormancy manager component 908, depicted in FIG. 9) may communicate in the wireless network based at least in part on the first dormancy state of the first network entity or the second dormancy state of the second network entity, as described above. As one example, by using a dormancy indication configuration, the network entity may enable the UE to correctly identify a dormancy state for each respective network entity associated with the dormancy indications. Using the dormancy indication configuration may help mitigate disrupted and/or lost communications between the network entity and the UE. Using the dormancy indication configuration may also enable the network entity to dynamically transition another network entity (or itself) to a dormant mode and reduce a power consumption in the cellular network.

Process 700 may include additional aspects, such as any single aspect or any combination of aspects described below and/or in connection with one or more other processes described elsewhere herein.

In a first aspect, transmitting the first dormancy indication and the second dormancy indication further comprises transmitting the first dormancy indication and the second dormancy indication as a first bit and a second bit in DCI. The inclusion of bits in DCI to indicate dormancy state information may enable the network entity to quickly transmit the dormancy state information to the UE using fewer air interface resources relative to other communication mechanisms.

In a second aspect, alone or in combination with the first aspect, process 700 includes associating the first dormancy indication with the first network entity and the second dormancy indication with the second network entity based at least in part on a fixed dormancy indication mapping associated with the first bit and the second bit.

In a third aspect, alone or in combination with one or more of the first and second aspects, the fixed dormancy indication mapping indicates a first dormancy mapping in which the first bit is associated with the first dormancy state of the first network entity and the second bit is associated with the second dormancy state of the second network entity, or a second dormancy mapping in which the first bit is associated with the second dormancy state of the second network entity and the second bit is associated with the first dormancy state of the first network entity.

In a fourth aspect, alone or in combination with one or more of the first through third aspects, process 700 includes transmitting an indication of a TCI codepoint element, wherein the TCI codepoint element includes a reserved bit configured with a value that specifies a dormancy indication configuration associated with the first bit and the second bit.

In a fifth aspect, alone or in combination with one or more of the first through fourth aspects, process 700 includes transmitting, prior to transmitting the first dormancy indication and the second dormancy indication, an RRC message that indicates a reserved bit interpretation configuration associated with the reserved bit.

In a sixth aspect, alone or in combination with one or more of the first through fifth aspects, the dormancy indication configuration indicates a first bit interpretation in which the first bit is associated with the first network entity and the second bit is associated with the second network entity, or a second bit interpretation in which the first bit is associated with the second network entity and the second bit is associated with the first network entity.

In a seventh aspect, alone or in combination with one or more of the first through sixth aspects, process 700 includes transmitting a third bit in the DCI that indicates a dormancy indication configuration associated with the first bit and the second bit.

In an eighth aspect, alone or in combination with one or more of the first through seventh aspects, process 700 includes transmitting an indication of a TCI state ID, wherein a value of the TCI state ID specifies a dormancy indication configuration associated with the first bit and the second bit.

In a ninth aspect, alone or in combination with one or more of the first through eighth aspects, the value specifies the dormancy indication configuration based at least in part on whether the value is an odd value or an even value.

In a tenth aspect, alone or in combination with one or more of the first through ninth aspects, process 700 includes transmitting an indication of a TCI codepoint index, wherein a value of the TCI codepoint index specifies a dormancy indication configuration associated with the first bit and the second bit.

In an eleventh aspect, alone or in combination with one or more of the first through tenth aspects, the value specifies the dormancy indication configuration based at least in part on an index value threshold.

In a twelfth aspect, alone or in combination with one or more of the first through eleventh aspects, the value specifies the dormancy indication configuration based at least in part on whether the value is an odd value or an even value.

In a thirteenth aspect, alone or in combination with one or more of the first through twelfth aspects, process 700 includes associating the first dormancy indication with the first network entity based at least in part on a first TCI state associated with the first network entity, and associating the second dormancy indication with the second network entity based at least in part on a second TCI state associated with the second network entity.

In a fourteenth aspect, alone or in combination with one or more of the first through thirteenth aspects, process 700 includes associating the first dormancy indication with the first network entity based at least in part on a first CORESET pool index associated with the first network entity, and associating the second dormancy indication with the second network entity based at least in part on a second CORESET pool index associated with the second network entity.

In a fifteenth aspect, alone or in combination with one or more of the first through fourteenth aspects, transmitting the first dormancy indication and the second dormancy indication further comprises transmitting the second dormancy indication explicitly, and transmitting the first dormancy indication implicitly with the second dormancy indication based at least in part on the first network entity and the second network entity communicating in a PCell, wherein the first dormancy indication specifies that the first dormancy state of the first network entity is in an active mode and the second dormancy indication specifies the second dormancy state of the second network entity.

In a sixteenth aspect, alone or in combination with one or more of the first through fifteenth aspects, process 700 includes associating the second dormancy indication with the second network entity based at least in part on a second CORESET pool index associated with the second network entity.

In a seventeenth aspect, alone or in combination with one or more of the first through sixteenth aspects, communicating in the wireless network further comprises transmitting information selectively using a physical downlink shared channel and based at least in part on the first dormancy indication or the second dormancy indication. By using dormancy indications, the network entity may reduce energy consumption the wireless network by reducing transmissions. Alternatively or additionally, the network entity may help the UE to preserve battery life by enabling the UE to refrain from monitoring a physical downlink shared channel associated with a dormant network entity.

In an eighteenth aspect, alone or in combination with one or more of the first through seventeenth aspects, transmitting in the wireless network further comprises transmitting one or more communication repetitions selectively using a physical downlink control channel and based at least in part on the first dormancy state or the second dormancy state. By using dormancy indications, the network entity may reduce energy consumption the wireless network by reducing transmission of a repetitive communication. Alternatively or additionally, the network entity may help the UE to preserve battery life by enabling the UE to refrain from monitoring for the repetitive communication.

In a nineteenth aspect, alone or in combination with one or more of the first through eighteenth aspects, the network entity is the first network entity or the second network entity.

In a twentieth aspect, alone or in combination with one or more of the first through nineteenth aspects, the first network entity is a first TRP and the second network entity is a second TRP.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
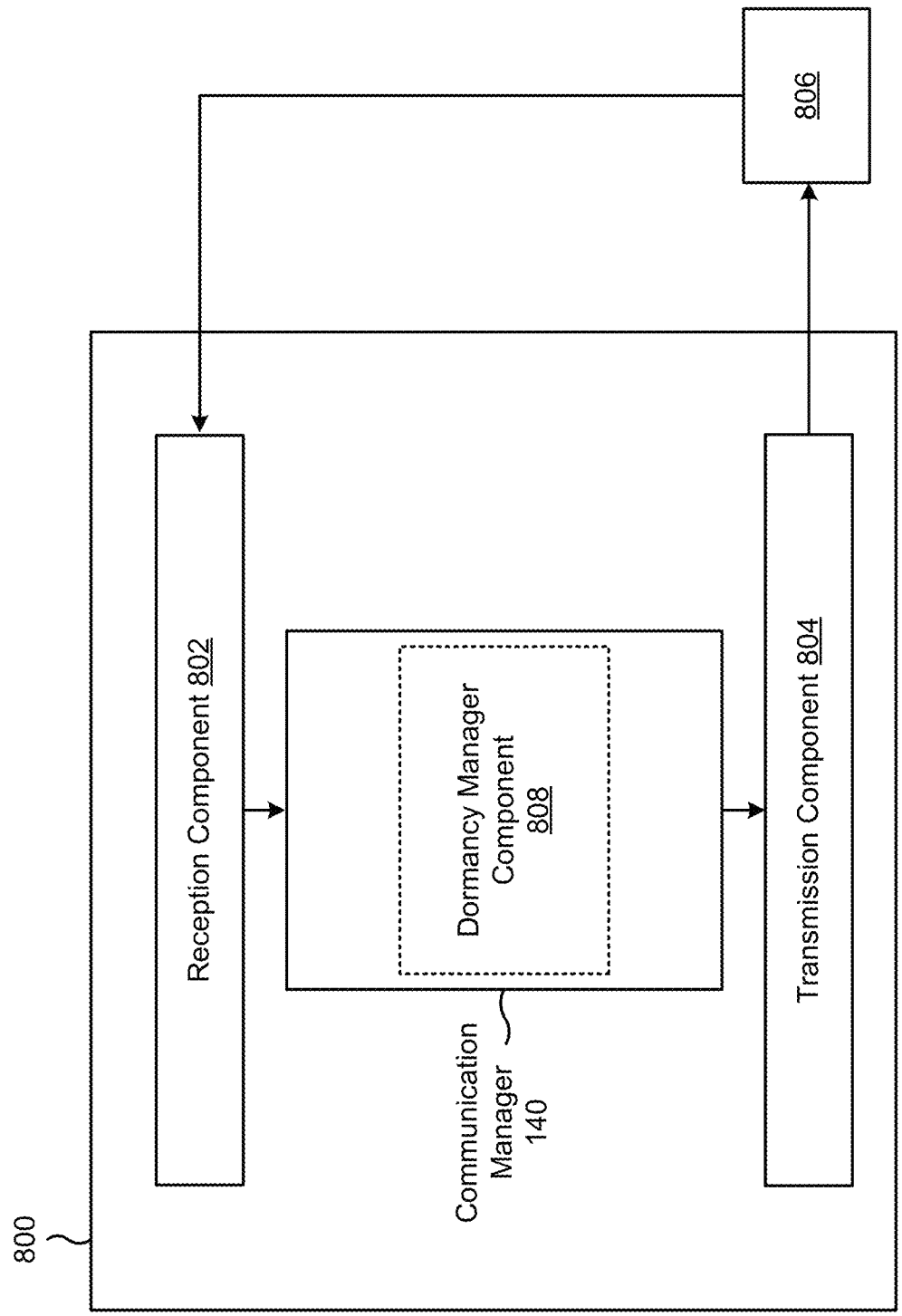
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a dormancy manager component 808, among other examples.

In some aspects, the apparatus 800 may be configured to perform one or more operations described herein in connection with FIGS. 3-5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive a first dormancy indication and a second dormancy indication. The dormancy manager component 808 may enable the UE to communicate in a wireless network based at least in part on associating the first dormancy indication with a first dormancy state of a first network entity in the wireless network and associating the second dormancy indication with a second dormancy state of a second network entity in the wireless network.

The dormancy manager component 808 may associate the first dormancy indication with the first network entity and the second dormancy indication with the second network entity based at least in part on a fixed dormancy indication mapping associated with the first bit and the second bit.

The reception component 802 may receive an indication of a transmission configuration indicator (TCI) codepoint element.

The dormancy manager component 808 may determine a dormancy indication configuration associated with the first bit and the second bit based at least in part on a value of a reserved bit associated with the TCI codepoint element.

The reception component 802 may receive, prior to receiving the first dormancy indication and the second dormancy indication, an RRC message that indicates a reserved bit interpretation configuration associated with the reserved bit.

The reception component 802 may receive a third bit in the DCI that indicates a dormancy indication configuration associated with the first bit and the second bit.

The reception component 802 may receive an indication of a TCI state ID.

The dormancy manager component 808 may determine a dormancy indication configuration associated with the first bit and the second bit based at least in part on a value of the TCI state ID.

The reception component 802 may receive an indication of a TCI codepoint index.

The dormancy manager component 808 may determine a dormancy indication configuration associated with the first bit and the second bit based at least in part on a value of the TCI codepoint index.

The dormancy manager component 808 may associate the first dormancy indication with the first network entity based at least in part on a first TCI state associated with the first network entity.

The dormancy manager component 808 may associate the second dormancy indication with the second network entity based at least in part on a second TCI state associated with the second network entity.

The dormancy manager component 808 may associate the first dormancy indication with the first network entity based at least in part on a first CORESET pool index associated with the first network entity.

The dormancy manager component 808 may associate the second dormancy indication with the second network entity based at least in part on a second CORESET pool index associated with the second network entity.

The dormancy manager component 808 may associate the second dormancy indication with the second network entity based at least in part on a second CORESET pool index associated with the second network entity.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
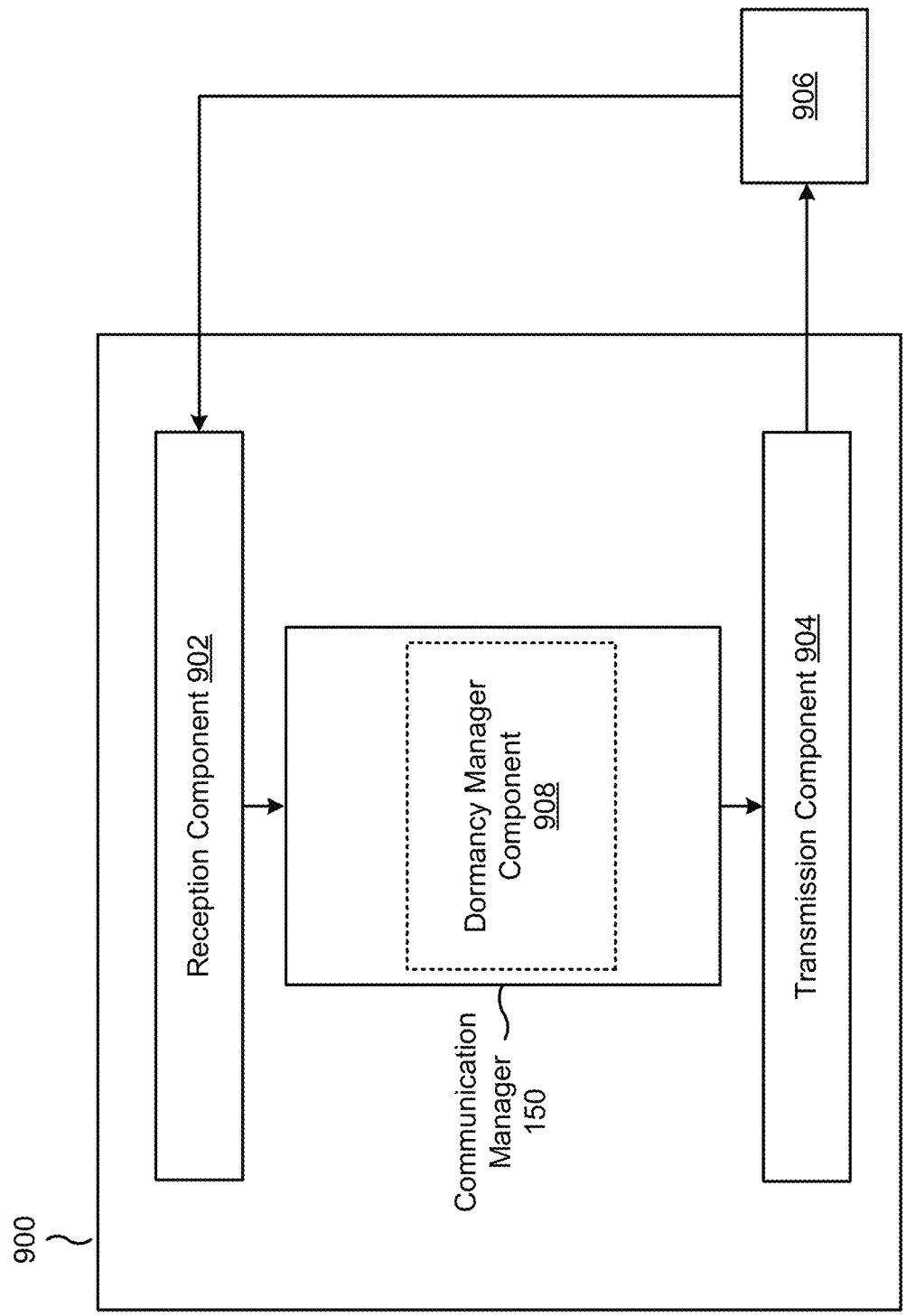
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network entity, or a network entity may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include one or more of a dormancy manager component 908, among other examples.

In some aspects, the apparatus 900 may be configured to perform one or more operations described herein in connection with FIGS. 3-5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the network entity described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network entity described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network entity described in connection with FIG. 2. In some aspects, the transmission component 904 may be co-located with the reception component 902 in a transceiver.

The transmission component 904 may transmit a first dormancy indication that indicates a first dormancy state of a first network entity in a wireless network and a second dormancy indication that indicates a second dormancy state of a second network entity in the wireless network, the first network entity and the second network entity associated with a UE. The dormancy manager component 908 may enable the network entity to communicate in the wireless network based at least in part on the first dormancy state of the first network entity or the second dormancy state of the second network entity.

The dormancy manager component 908 may associate the first dormancy indication with the first network entity and the second dormancy indication with the second network entity based at least in part on a fixed dormancy indication mapping associated with the first bit and the second bit.

The transmission component 904 may transmit an indication of a TCI codepoint element, wherein the TCI codepoint element includes a reserved bit configured with a value that specifies a dormancy indication configuration associated with the first bit and the second bit.

The transmission component 904 may transmit, prior to transmitting the first dormancy indication and the second dormancy indication, an RRC message that indicates a reserved bit interpretation configuration associated with the reserved bit.

The transmission component 904 may transmit a third bit in the DCI that indicates a dormancy indication configuration associated with the first bit and the second bit.

The transmission component 904 may transmit an indication of a TCI state ID, wherein a value of the TCI state ID specifies a dormancy indication configuration associated with the first bit and the second bit.

The transmission component 904 may transmit an indication of a TCI codepoint index, wherein a value of the TCI codepoint index specifies a dormancy indication configuration associated with the first bit and the second bit.

The dormancy manager component 908 may associate the first dormancy indication with the first network entity based at least in part on a first TCI state associated with the first network entity.

The dormancy manager component 908 may associate the second dormancy indication with the second network entity based at least in part on a second TCI state associated with the second network entity.

The dormancy manager component 908 may associate the first dormancy indication with the first network entity based at least in part on a first CORESET pool index associated with the first network entity.

The dormancy manager component 908 may associate the second dormancy indication with the second network entity based at least in part on a second CORESET pool index associated with the second network entity.

The dormancy manager component 908 may associate the second dormancy indication with the second network entity based at least in part on a second CORESET pool index associated with the second network entity.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving a first dormancy indication and a second dormancy indication; and communicating in a wireless network based at least in part on associating the first dormancy indication with a first dormancy state of a first network entity in the wireless network and associating the second dormancy indication with a second dormancy state of a second network entity in the wireless network.

Aspect 2: The method of Aspect 1, wherein receiving the first dormancy indication and the second dormancy indication further comprises: receiving the first dormancy indication and the second dormancy indication as a first bit and a second bit in downlink control information (DCI).

Aspect 3: The method of Aspect 2, further comprising: associating the first dormancy indication with the first network entity and the second dormancy indication with the second network entity based at least in part on a fixed dormancy indication mapping associated with the first bit and the second bit.

Aspect 4: The method of Aspect 3, wherein the fixed dormancy indication mapping indicates: a first dormancy mapping in which the first bit is associated with the first dormancy state of the first network entity and the second bit is associated with the second dormancy state of the second network entity, or a second dormancy mapping in which the first bit is associated with the second dormancy state of the second network entity and the second bit is associated with the first dormancy state of the first network entity.

Aspect 5: The method of Aspect 2, further comprising: receiving an indication of a transmission configuration indicator (TCI) codepoint element; and determining a dormancy indication configuration associated with the first bit and the second bit based at least in part on a value of a reserved bit associated with the TCI codepoint element.

Aspect 6: The method of Aspect 5, further comprising: receiving, prior to receiving the first dormancy indication and the second dormancy indication, a radio resource control (RRC) message that indicates a reserved bit interpretation configuration associated with the reserved bit.

Aspect 7: The method of Aspect 5 or Aspect 6, wherein the dormancy indication configuration indicates: a first bit interpretation in which the first bit is associated with the first network entity and the second bit is associated with the second network entity; or a second bit interpretation in which the first bit is associated with the second network entity and the second bit is associated with the first network entity.

Aspect 8: The method of Aspect 2, further comprising: receiving a third bit in the DCI that indicates a dormancy indication configuration associated with the first bit and the second bit.

Aspect 9: The method of Aspect 2, further comprising: receiving an indication of a transmission configuration indicator (TCI) state identifier (ID); and determining a dormancy indication configuration associated with the first bit and the second bit based at least in part on a value of the TCI state ID.

Aspect 10: The method of Aspect 9, wherein determining the dormancy indication configuration based at least in part on the value further comprises: determining the dormancy indication configuration based at least in part on whether the value is an odd value or an even value.

Aspect 11: The method of Aspect 2, further comprising: receiving an indication of a transmission configuration indicator (TCI) codepoint index; and determining a dormancy indication configuration associated with the first bit and the second bit based at least in part on a value of the TCI codepoint index.

Aspect 12: The method of Aspect 11, wherein determining the dormancy indication configuration further comprises: determining the dormancy indication configuration based at least in part on whether the value satisfies an index value threshold.

Aspect 13: The method of Aspect 11 or Aspect 12, wherein determining the dormancy indication configuration further comprises: determining the dormancy indication configuration based at least in part on whether the value is an odd value or an even value.

Aspect 14: The method of any one of Aspects 1-13, further comprising: associating the first dormancy indication with the first network entity based at least in part on a first transmission configuration indicator (TCI) state associated with the first network entity; and associating the second dormancy indication with the second network entity based at least in part on a second TCI state associated with the second network entity.

Aspect 15: The method of Aspect 1, further comprising: associating the first dormancy indication with the first network entity based at least in part on a first control resource set (CORESET) pool index associated with the first network entity; and associating the second dormancy indication with the second network entity based at least in part on a second CORESET pool index associated with the second network entity.

Aspect 16: The method of Aspect 1, wherein receiving the first dormancy indication and the second dormancy indication further comprises: receiving the second dormancy indication explicitly; and receiving the first dormancy indication implicitly with the second dormancy indication based at least in part on communicating with the first network entity and the second network entity using a primary cell (PCell), wherein the first dormancy indication specifies that the first dormancy state of the first network entity is in an active mode and the second dormancy indication specifies the second dormancy state of the second network entity.

Aspect 17: The method of Aspect 16 further comprising: associating the second dormancy indication with the second network entity based at least in part on a second control resource set (CORESET) pool index associated with the second network entity.

Aspect 18: The method of any one of Aspects 1-17, wherein communicating in the wireless network further comprises: receiving information from the first network entity or the second network entity using a physical downlink shared channel and based at least in part on the first dormancy indication and the second dormancy indication.

Aspect 19: The method of any one of Aspects 1-17, wherein communicating in the wireless network further comprises: receiving one or more communication repetitions from the first network entity or the second network entity using a physical downlink control channel and based at least in part on the first dormancy indication and the second dormancy indication.

Aspect 20: The method of any one of Aspects 1-19, wherein the first network entity is a first transmission/reception point (TRP) and the second network entity is a second TRP.

Aspect 21: A method of wireless communication performed by a network entity, comprising: transmitting a first dormancy indication that indicates a first dormancy state of a first network entity in a wireless network and a second dormancy indication that indicates a second dormancy state of a second network entity in the wireless network, the first network entity and the second network entity associated with a user equipment (UE); and communicating in the wireless network based at least in part on the first dormancy state of the first network entity or the second dormancy state of the second network entity.

Aspect 22: The method of Aspect 21, wherein transmitting the first dormancy indication and the second dormancy indication further comprises: transmitting the first dormancy indication and the second dormancy indication as a first bit and a second bit in downlink control information (DCI).

Aspect 23: The method of Aspect 22, further comprising: associating the first dormancy indication with the first network entity and the second dormancy indication with the second network entity based at least in part on a fixed dormancy indication mapping associated with the first bit and the second bit.

Aspect 24: The method of Aspect 23, wherein the fixed dormancy indication mapping indicates: a first dormancy mapping in which the first bit is associated with the first dormancy state of the first network entity and the second bit is associated with the second dormancy state of the second network entity; or a second dormancy mapping in which the first bit is associated with the second dormancy state of the second network entity and the second bit is associated with the first dormancy state of the first network entity.

Aspect 25: The method of Aspect 22, further comprising: transmitting an indication of a transmission configuration indicator (TCI) codepoint element, wherein the TCI codepoint element includes a reserved bit configured with a value that specifies a dormancy indication configuration associated with the first bit and the second bit.

Aspect 26: The method of Aspect 25, further comprising: transmitting, prior to transmitting the first dormancy indication and the second dormancy indication, a radio resource control (RRC) message that indicates a reserved bit interpretation configuration associated with the reserved bit.

Aspect 27: The method of Aspect 25 or Aspect 26, wherein the dormancy indication configuration indicates: a first bit interpretation in which the first bit is associated with the first network entity and the second bit is associated with the second network entity; or a second bit interpretation in which the first bit is associated with the second network entity and the second bit is associated with the first network entity.

Aspect 28: The method of any one of Aspects 22-27, further comprising: transmitting a third bit in the DCI that indicates a dormancy indication configuration associated with the first bit and the second bit.

Aspect 29: The method of Aspect 22, further comprising: transmitting an indication of a transmission configuration indicator (TCI) state identifier (ID), wherein a value of the TCI state ID specifies a dormancy indication configuration associated with the first bit and the second bit.

Aspect 30: The method of Aspect 29, wherein the value specifies the dormancy indication configuration based at least in part on whether the value is an odd value or an even value.

Aspect 31: The method of Aspect 22, further comprising: transmitting an indication of a transmission configuration indicator (TCI) codepoint index, wherein a value of the TCI codepoint index specifies a dormancy indication configuration associated with the first bit and the second bit.

Aspect 32: The method of Aspect 31, wherein the value specifies the dormancy indication configuration based at least in part on an index value threshold.

Aspect 33: The method of Aspect 31, wherein the value specifies the dormancy indication configuration based at least in part on whether the value is an odd value or an even value.

Aspect 34: The method of any one of Aspects 21-33, further comprising: associating the first dormancy indication with the first network entity based at least in part on a first transmission configuration indicator (TCI) state associated with the first network entity; and associating the second dormancy indication with the second network entity based at least in part on a second TCI state associated with the second network entity.

Aspect 35: The method of any one of Aspects 21-34, further comprising: associating the first dormancy indication with the first network entity based at least in part on a first control resource set (CORESET) pool index associated with the first network entity; and associating the second dormancy indication with the second network entity based at least in part on a second CORESET pool index associated with the second network entity.

Aspect 36: The method of Aspect 21, wherein transmitting the first dormancy indication and the second dormancy indication further comprises: transmitting the second dormancy indication explicitly; and transmitting the first dormancy indication implicitly with the second dormancy indication based at least in part on the first network entity and the second network entity communicating in a primary cell (PCell), wherein the first dormancy indication specifies that the first dormancy state of the first network entity is in an active mode and the second dormancy indication specifies the second dormancy state of the second network entity.

Aspect 37: The method of Aspect 36 further comprising: associating the second dormancy indication with the second network entity based at least in part on a second control resource set (CORESET) pool index associated with the second network entity.

Aspect 38: The method of any one of Aspects 21-37, wherein communicating in the wireless network further comprises: transmitting information selectively using a physical downlink shared channel and based at least in part on the first dormancy indication or the second dormancy indication.

Aspect 39: The method of any one of Aspects 21-38, wherein transmitting in the wireless network further comprises: transmitting one or more communication repetitions selectively using a physical downlink control channel and based at least in part on the first dormancy state or the second dormancy state.

Aspect 40: The method of any one of Aspects 21-39, wherein the network entity is the first network entity or the second network entity.

Aspect 41: The method of any one of Aspects 21-40, wherein the first network entity is a first transmission/reception point (TRP) and the second network entity is a second TRP.

Aspect 42: An apparatus for wireless communication at a device, comprising a processor; memory coupled with the processor; and instructions stored in the memory and executable by the processor to cause the apparatus to perform the method of one or more of Aspects 1-20.

Aspect 43: An apparatus for wireless communication at a device, comprising a processor; memory coupled with the processor; and instructions stored in the memory and executable by the processor to cause the apparatus to perform the method of one or more of Aspects 21-41.

Aspect 44: A device for wireless communication, comprising a memory and one or more processors coupled to the memory, the one or more processors configured to perform the method of one or more of Aspects 1-20.

Aspect 45: A device for wireless communication, comprising a memory and one or more processors coupled to the memory, the one or more processors configured to perform the method of one or more of Aspects 21-41.

Aspect 46: An apparatus for wireless communication, comprising at least one means for performing the method of one or more of Aspects 1-20.

Aspect 47: An apparatus for wireless communication, comprising at least one means for performing the method of one or more of Aspects 21-41.

Aspect 48: A non-transitory computer-readable medium storing code for wireless communication, the code comprising instructions executable by a processor to perform the method of one or more of Aspects 1-20.

Aspect 49: A non-transitory computer-readable medium storing code for wireless communication, the code comprising instructions executable by a processor to perform the method of one or more of Aspects 21-41.

Aspect 50: A non-transitory computer-readable medium storing a set of instructions for wireless communication, the set of instructions comprising one or more instructions that, when executed by one or more processors of a device, cause the device to perform the method of one or more of Aspects 1-20.

Aspect 51: A non-transitory computer-readable medium storing a set of instructions for wireless communication, the set of instructions comprising one or more instructions that, when executed by one or more processors of a device, cause the device to perform the method of one or more of Aspects 21-41.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      receive a first dormancy indication and a second dormancy indication;
      associate the first dormancy indication with a first dormancy state of a first network entity in a wireless network based at least in part on a first transmission configuration indicator (TCI) state associated with the first network entity;
      associate the first dormancy indication with the first network entity based at least in part on a first control resource set (CORESET) pool index associated with the first network entity;
      associate the second dormancy indication with a second dormancy state of a second network entity in the wireless network based at least in part on a second TCI state associated with the second network entity;
      associate the second dormancy indication with the second network entity based at least in part on a second CORESET pool index associated with the second network entity; and
      communicate in the wireless network based at least in part on associating the first dormancy indication with the first dormancy state of the first network entity in the wireless network and associating the second dormancy indication with the second dormancy state of the second network entity in the wireless network.

2. The apparatus of claim 1, wherein the one or more processors, to receive the first dormancy indication and the second dormancy indication, are configured to:
   receive the first dormancy indication and the second dormancy indication as a first bit and a second bit in downlink control information (DCI).

3. The apparatus of claim 2, wherein the one or more processors are further configured to:
   receive an indication of a TCI codepoint element; and
   determine a dormancy indication configuration associated with the first bit and the second bit based at least in part on a value of a reserved bit associated with the TCI codepoint element.

4. The apparatus of claim 2, wherein the one or more processors are further configured to:
receive a third bit in the DCI that indicates a dormancy indication configuration associated with the first bit and the second bit.

5. The apparatus of claim 2, wherein the one or more processors are further configured to:
receive an indication of a TCI state identifier (ID); and
determine a dormancy indication configuration associated with the first bit and the second bit based at least in part on a value of the TCI state ID.

6. The apparatus of claim 2, wherein the one or more processors are further configured to:
receive an indication of a TCI codepoint index; and
determine a dormancy indication configuration associated with the first bit and the second bit based at least in part on a value of the TCI codepoint index.

7. The apparatus of claim 1, wherein the one or more processors, to receive the first dormancy indication and the second dormancy indication, are configured to:
receive the second dormancy indication explicitly; and
receive the first dormancy indication implicitly with the second dormancy indication based at least in part on communicating with the first network entity and the second network entity using a primary cell (PCell), wherein the first dormancy indication specifies that the first dormancy state of the first network entity is in an active mode and the second dormancy indication specifies the second dormancy state of the second network entity.

8. The apparatus of claim 1, wherein the one or more processors, to communicate in the wireless network, are configured to:
receive information from the first network entity or the second network entity using a physical downlink shared channel and based at least in part on the first dormancy indication and the second dormancy indication.

9. The apparatus of claim 1, wherein the one or more processors, to communicate in the wireless network, are configured to:
receive one or more communication repetitions from the first network entity or the second network entity using a physical downlink control channel and based at least in part on the first dormancy indication and the second dormancy indication.

10. An apparatus for wireless communication at a network entity, comprising:
one or more memories; and
one or more processors, coupled to the one or more memories, configured to:
associate a first dormancy indication with a first dormancy state of a first network entity in a wireless network based at least in part on a first transmission configuration indicator (TCI) state associated with the first network entity;
associate the first dormancy indication with the first network entity based at least in part on a first control resource set (CORESET) pool index associated with the first network entity;
associate a second dormancy indication with a second dormancy state of a second network entity in the wireless network based at least in part on a second TCI state associated with the second network entity;
associate the second dormancy indication with the second network entity based at least in part on a second CORESET pool index associated with the second network entity;
transmit the first dormancy indication that indicates the first dormancy state of the first network entity in the wireless network and the second dormancy indication that indicates the second dormancy state of the second network entity in the wireless network, the first network entity and the second network entity associated with a user equipment (UE); and
communicate in the wireless network based at least in part on the first dormancy state of the first network entity or the second dormancy state of the second network entity.

11. The apparatus of claim 10, wherein the one or more processors, to transmit the first dormancy indication and the second dormancy indication, are configured to:
transmit the first dormancy indication and the second dormancy indication as a first bit and a second bit in downlink control information (DCI).

12. The apparatus of claim 11, wherein the one or more processors are further configured to:
associate the first dormancy indication with the first network entity and the second dormancy indication with the second network entity based at least in part on a fixed dormancy indication mapping associated with the first bit and the second bit.

13. The apparatus of claim 11, wherein the one or more processors are further configured to:
transmit an indication of a TCI codepoint element, wherein the TCI codepoint element includes a reserved bit configured with a value that specifies a dormancy indication configuration associated with the first bit and the second bit.

14. The apparatus of claim 11, wherein the one or more processors are further configured to:
transmit a third bit in the DCI that indicates a dormancy indication configuration associated with the first bit and the second bit.

15. The apparatus of claim 11, wherein the one or more processors are further configured to:
transmit an indication of a TCI state identifier (ID), wherein a value of the TCI state ID specifies a dormancy indication configuration associated with the first bit and the second bit.

16. The apparatus of claim 11, wherein the one or more processors are further configured to:
transmit an indication of a TCI codepoint index, wherein a value of the TCI codepoint index specifies a dormancy indication configuration associated with the first bit and the second bit.

17. The apparatus of claim 10, wherein the one or more processors, to transmit the first dormancy indication and the second dormancy indication, are configured to:
transmit the second dormancy indication explicitly; and
transmit the first dormancy indication implicitly with the second dormancy indication based at least in part on the first network entity and the second network entity communicating in a primary cell (PCell), wherein the first dormancy indication specifies that the first dormancy state of the first network entity is in an active mode and the second dormancy indication specifies the second dormancy state of the second network entity.

18. The apparatus of claim 10, wherein the one or more processors, to communicate in the wireless network, are configured to:

transmit information selectively using a physical downlink shared channel and based at least in part on the first dormancy indication or the second dormancy indication.

19. The apparatus of claim 10, wherein the one or more processors, to transmit in the wireless network, are configured to:
transmit one or more communication repetitions selectively using a physical downlink control channel and based at least in part on the first dormancy state or the second dormancy state.

20. A method of wireless communication performed by a user equipment (UE), comprising:
receiving a first dormancy indication and a second dormancy indication;
associating the first dormancy indication with a first dormancy state of a first network entity in a wireless network based at least in part on a first transmission configuration indicator (TCI) state associated with the first network entity;
associating the first dormancy indication with the first network entity based at least in part on a first control resource set (CORESET) pool index associated with the first network entity;
associating the second dormancy indication with a second dormancy state of a second network entity in the wireless network based at least in part on a second TCI state associated with the second network entity;
associating the second dormancy indication with the second network entity based at least in part on a second CORESET pool index associated with the second network entity; and
communicating in the wireless network based at least in part on associating the first dormancy indication with the first dormancy state of the first network entity in the wireless network and associating the second dormancy indication with the second dormancy state of the second network entity in the wireless network.

21. The method of claim 20, wherein receiving the first dormancy indication and the second dormancy indication further comprises:
receiving the first dormancy indication and the second dormancy indication as a first bit and a second bit in downlink control information (DCI).

22. The method of claim 21, further comprising:
receiving an indication of a TCI codepoint element; and
determining a dormancy indication configuration associated with the first bit and the second bit based at least in part on a value of a reserved bit associated with the TCI codepoint element.

23. The method of claim 21, further comprising:
receiving a third bit in the DCI that indicates a dormancy indication configuration associated with the first bit and the second bit.

24. The method of claim 21, further comprising:
receiving an indication of a TCI state identifier (ID); and
determining a dormancy indication configuration associated with the first bit and the second bit based at least in part on a value of the TCI state ID.

25. The method of claim 21, further comprising:
receiving an indication of a TCI codepoint index; and
determining a dormancy indication configuration associated with the first bit and the second bit based at least in part on a value of the TCI codepoint index.

26. The method of claim 20, wherein receiving the first dormancy indication and the second dormancy indication further comprises:
receiving the second dormancy indication explicitly; and
receiving the first dormancy indication implicitly with the second dormancy indication based at least in part on communicating with the first network entity and the second network entity using a primary cell (PCell), wherein the first dormancy indication specifies that the first dormancy state of the first network entity is in an active mode and the second dormancy indication specifies the second dormancy state of the second network entity.

27. A method of wireless communication performed by a network entity, comprising:
associating a first dormancy indication with a first dormancy state of a first network entity in a wireless network based at least in part on a first transmission configuration indicator (TCI) state associated with the first network entity;
associating the first dormancy indication with the first network entity based at least in part on a first control resource set (CORESET) pool index associated with the first network entity;
associating a second dormancy indication with a second dormancy state of a second network entity in the wireless network based at least in part on a second TCI state associated with the second network entity;
associating the second dormancy indication with the second network entity based at least in part on a second CORESET pool index associated with the second network entity
transmitting the first dormancy indication that indicates the first dormancy state of the first network entity in the wireless network and the second dormancy indication that indicates the second dormancy state of the second network entity in the wireless network, the first network entity and the second network entity associated with a user equipment (UE); and
communicating in the wireless network based at least in part on the first dormancy state of the first network entity or the second dormancy state of the second network entity.

* * * * *